United States Patent
Lawson et al.

(10) Patent No.: US 8,261,805 B2
(45) Date of Patent: Sep. 11, 2012

(54) TIRE AND WHEEL MOUNTING SYSTEM AND METHOD

(75) Inventors: Lawrence J. Lawson, Troy, MI (US); Robert Reece, Clarkston, MI (US); Richard J. Standen, Grosse Ile, MI (US); Richard E. Hamilton, Flint, MI (US)

(73) Assignee: Android Industries LLC, Auburn Hills, MI (US)

( * ) Notice: Subject to any disclaimer, the term of this patent is extended or adjusted under 35 U.S.C. 154(b) by 0 days.

(21) Appl. No.: 13/039,518

(22) Filed: Mar. 3, 2011

(65) Prior Publication Data
US 2011/0146077 A1    Jun. 23, 2011

Related U.S. Application Data

(63) Continuation of application No. 11/957,068, filed on Dec. 14, 2007, now abandoned.

(60) Provisional application No. 60/882,377, filed on Dec. 28, 2006, provisional application No. 60/984,853, filed on Nov. 2, 2007.

(51) Int. Cl.
*B60C 25/00* (2006.01)
*B60C 25/20* (2006.01)

(52) U.S. Cl. ............................................ 157/1.1; 157/5

(58) Field of Classification Search ................... 157/1.1, 157/5
See application file for complete search history.

(56) References Cited

U.S. PATENT DOCUMENTS

| 3,791,434 A | 2/1974 | Duquesne et al. |
| 4,986,328 A | 1/1991 | Metzger et al. |
| 5,094,284 A | 3/1992 | Curcuri |
| 7,264,032 B2 | 9/2007 | Peinelt et al. |
| 2007/0000616 A1 | 1/2007 | Rogalla et al. |

FOREIGN PATENT DOCUMENTS

| DE | 2535734 A1 | 2/1977 |
| DE | 3614738 | 11/1987 |
| DE | 3614738 A1 | 11/1987 |
| DE | 102005001212 | 7/2006 |
| DE | 102005001212 A1 | 7/2006 |
| DE | EP1738937 | 1/2007 |
| EP | 1942019 A1 | 7/2008 |
| FR | 2804908 | 8/2001 |

OTHER PUBLICATIONS

Canadian Office Action dated Oct. 6, 2011 for Canadian Application Serial No. 2,616,275.
India Office Action dated Sep. 21, 2011 for Indian Application Serial No. 3138/CHE/2007.

(Continued)

*Primary Examiner* — Bryan R Muller
(74) *Attorney, Agent, or Firm* — Honigman Miller Schwartz and Cohn LLP

(57) ABSTRACT

A system for providing at least a partially mounted tire and wheel assembly is disclosed. The system includes the steps of using a prime mover to bring a tire and wheel together and using the primer mover to work on at least one of the tire or the wheel to mount the tire and the wheel together, wherein the work performed by the prime mover is the only positive work introduced into the tire/wheel system.

2 Claims, 26 Drawing Sheets

OTHER PUBLICATIONS

Notification of Reasons for Refusal for JP Application 2007-333293 dated Jun. 22, 2010 (Japanese Language and English Language).
Office Action from Canadian Patent Office for Application 2616275 dated Nov. 8, 2010.
Office Action dated Jun. 9, 2010 for U.S. Appl. No. 11/957,068.
Office Action dated Dec. 3, 2010 for U.S. Appl. No. 11/957,068.
Office Action from Mexican Patent Office for Application MX/a/2007/016446 dated Feb. 18, 2011 (including English translation).
Office Action from Canadian Patent Office for Application 2616275 dated May 24, 2012.

TIRE AND WHEEL MOUNTING SYSTEM AND METHOD

REFERENCE TO RELATED APPLICATIONS

This U.S. patent application is a continuation application of U.S. Ser. No. 11/957,068 filed on Dec. 14, 2007, now abandoned, and claims priority under 35 U.S.C. §119(e) to U.S. Provisional Applications: 60/882,377 filed on Dec. 28, 2006 and 60/984,853filed on Nov. 2, 2007. The disclosures of these prior applications are considered part of the disclosure of this application and are hereby incorporated by reference in their entirety.

FIELD OF THE INVENTION

The disclosure relates to tire and wheel assemblies and to a system and method for mounting tires and wheels together.

BACKGROUND OF THE INVENTION

Partially automated equipment for mounting vehicle tires to vehicle wheels is commonly available. Some of this equipment is designed to be used, for example, in an automobile repair shop setting where, for example, low volume tire-wheel de/mounting tasks are common.

Fully automated equipment for mounting vehicle tires to vehicle wheels is also commonly available. Fully automated systems typically employ delivery systems wherein tires and wheels are continually fed to an apparatus which mounts vehicle wheels to vehicle tires. Equipment which is fully automated can easily mount hundreds of tires to wheels in an eight hour work shift.

Although fully automated tire mounting equipment is known, it lacks compactness and it often includes a significant financial investment because of the sophisticated controls, actuators, mechanisms, sensors, and the like that have been traditionally used for manipulating the tires and wheels into position, mounting the tires onto the wheels, and shuttling the tire/wheel assembly away from the mounting machine. The most common automated approach to mounting vehicle tires to vehicle wheels is included (1) fixing the vehicle wheels in a stationary position, (2) partially lodging the vehicle tire over at least an edge portion of the vehicle wheel, and (3) using an installation tool to urge (i.e. do positive work) a remaining portion of the tire bead over an edge portion of the wheel. This urging step has traditionally been carried out by downwardly urging the tire bead over the wheel bead seat by way of an installation tool (e.g. a roller wheel) or the like.

Although the above methods for mounting a vehicle tire to a vehicle wheel are effective, these methods are expensive to implement and require significant factory floor space. The present invention overcomes drawbacks associated with the prior art by setting forth a simple method for mounting a vehicle tire to a vehicle wheel such that only minimal equipment is necessary.

BRIEF DESCRIPTION OF THE DRAWINGS

The disclosure will now be described, by way of example, with reference to the accompanying drawings, in which.

DETAILED DESCRIPTION OF THE INVENTION

Figure 1A:
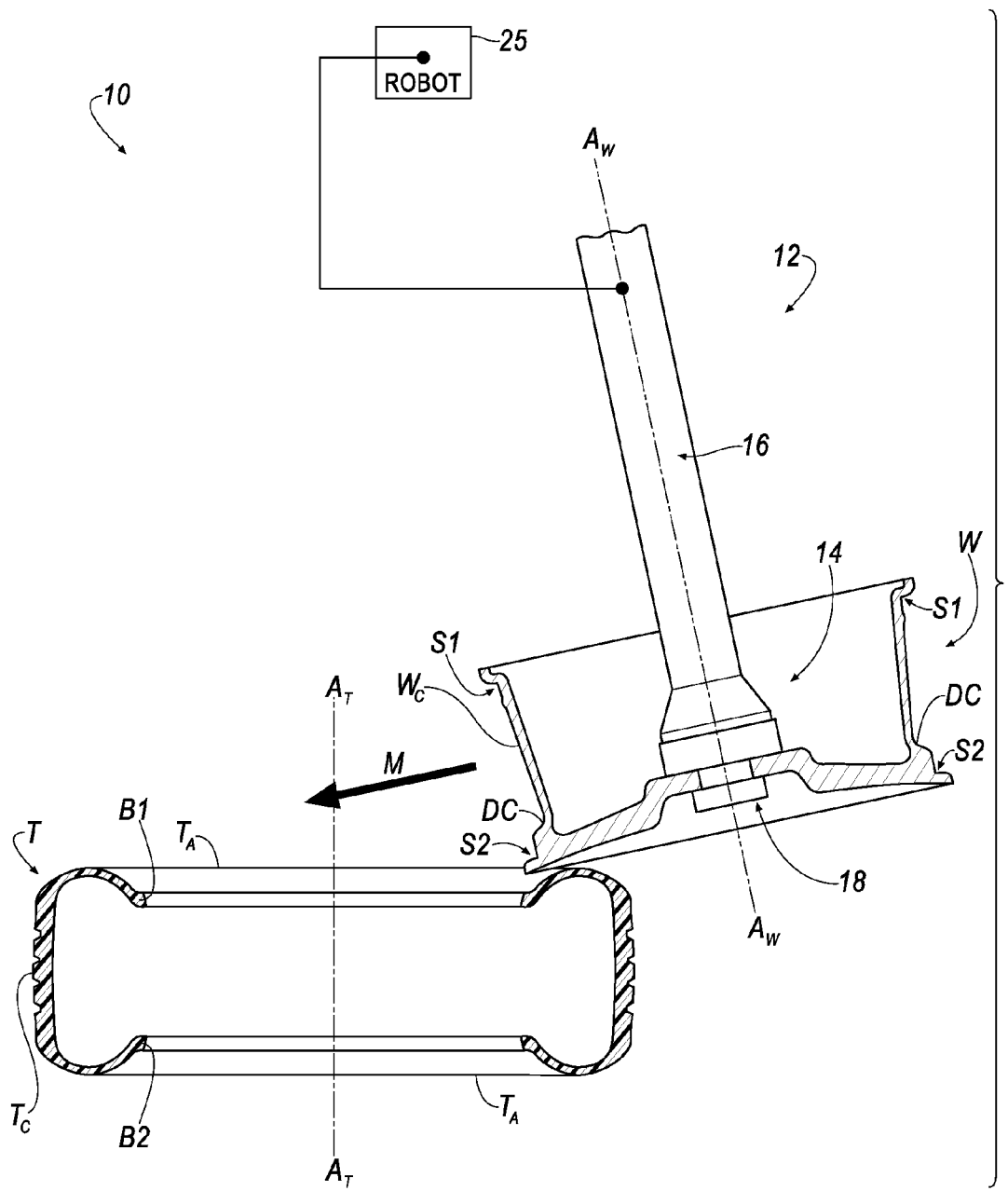
FIGS. 1A-1C illustrate a series of steps for mounting a vehicle tire and a vehicle wheel in accordance with an exemplary embodiment of the invention.
Figure 1B:
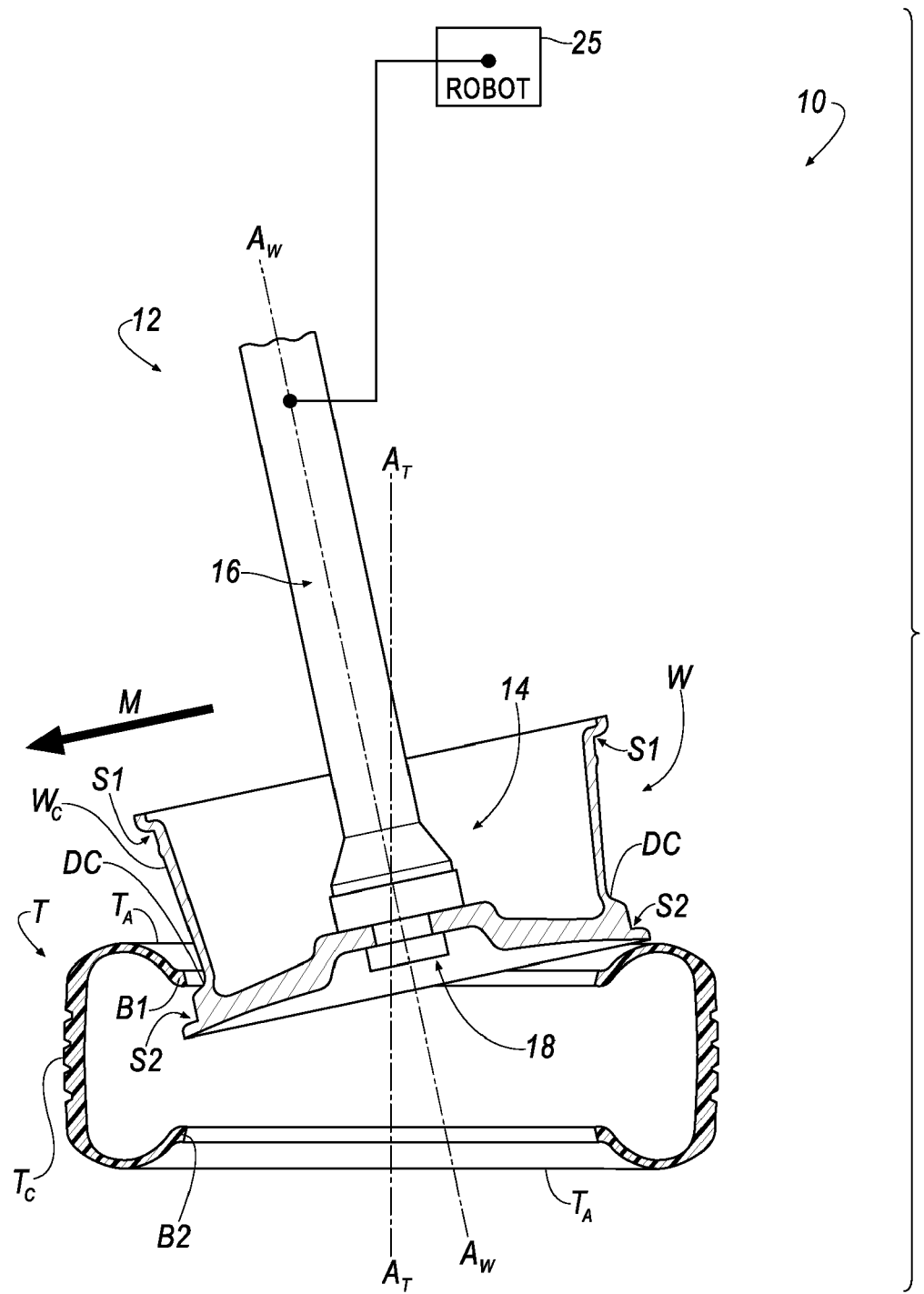

The Figures illustrate an exemplary embodiment of a system and method for mounting a tire to a wheel in accordance with an embodiment of the invention. Based on the foregoing, it is to be generally understood that the nomenclature used herein is simply for convenience and the terms used to describe the invention should be given the broadest meaning by one of ordinary skill in the art. For example, the phrase "mounting a tire to a wheel" is used throughout this disclosure. It is synonymous with "mounting a wheel to a tire." Also the phrase "tire axis of rotation" or "wheel axis of rotation" is understood to mean the imaginary axis around which a tire or wheel rotates when it is functioning in a vehicle. Also, the terms "revolvingly manipulating" a tire or a wheel, is used throughout the disclosure. This term is to be broadly construed as covering at least the movement patterns contemplated in FIGS. 1D through 1J. Specifically, FIG. 1D depicts a simple rotation of a wheel W, or a tire T about its respectively associated wheel axis WA, tire axis TA. FIG. 1E depicts a rotation of a wheel W, or a tire T about an axis OA-OA wherein the wheel axis WA or tire axis TA is spaced a distance R from the axis OA-OA. FIG. 1F depicts the combined rotations shown in FIGS. 1D and 1E in that the wheel W, or tire T rotates about its own respective axis WA, TA as well as a second axis OA-OA wherein the wheel axis WA or tire axis TA is spaced from axis OA-OA by a distance R. In FIG. 1G, the rotational path of wheel W, or tire T is similar to that shown in conjunction with FIG. 1D except that the wheel axis WA or tire axis TA is pitched at an angle θ from the axis OA-OA. FIG. 1H shows the rotation of the wheel W, or tire T about offset axis OA-OA without rotation about its own respective axis WA, TA. FIG. 1I depicts the compound motion of the wheel W or the tire T about its own respective axis WA, TA as well as offset axis OA-OA. FIG. 1J depicts a helical rotational path traced out by wheel W or tire T wherein the wheel W or tire T is rotated in any manner shown in FIGS. 1D-1H in addition to being translated in a direction parallel to offset axis OA-OA. As is readily apparent from the depiction of FIG. 1A, the path traced out by wheel W, or tire T, in the embodiment of FIG. 1J is a path generally defined as a helix.

Referring to FIGS. 1A-3, a system for mounting a tire, T, and a wheel, W, is shown generally at 10 according to an embodiment. Although the system 10 is explained primarily from the vantage point of constraining the tire (i.e. impeding its movement relative to the wheel) and manipulating the wheel to mount the wheel to the tire, it is to be understood that system 10 may also be used by constraining the movement of the wheel (relative to the tire) and manipulating the tire to mount the tire to the wheel. In either mounting procedure, the system 10 yields a fully or partially mounted tire-wheel assembly, TW (see, e.g., FIGS. 1C, 3, 4D, 6, 8).

It is important to note that the present invention eliminates the need of traditional installation tools (sometimes referred to as removing tools, fitting tools, pressure roller wheels, tool packs, press-in rollers, bead deflectors, or the like) used in mounting a tire to a wheel and because the present invention eliminates traditional installation tools, it is accurate to characterize the present invention as a "tool-less" mounting system. In an embodiment, the present invention could also be understood as a mounting system wherein the wheel and the tire are manipulated in a way such that at least one of them performs work directly on the other (without the use of an intermediate tool). In this sense the "work performer" functions as the installation tool (or at least as part of the installation tool). In an embodiment, one of the tire or the wheel is driven by a prime mover (e.g. an electric motor), while the other remains passive. If the tire and wheel are considered a system (in the physics sense of the word), no other prime mover is used to introduce energy into the tire/wheel system. This approach is vastly different from traditional methods all of which include the use of intermediate installation tools to mount the tire to the wheel.

Figure 1C:
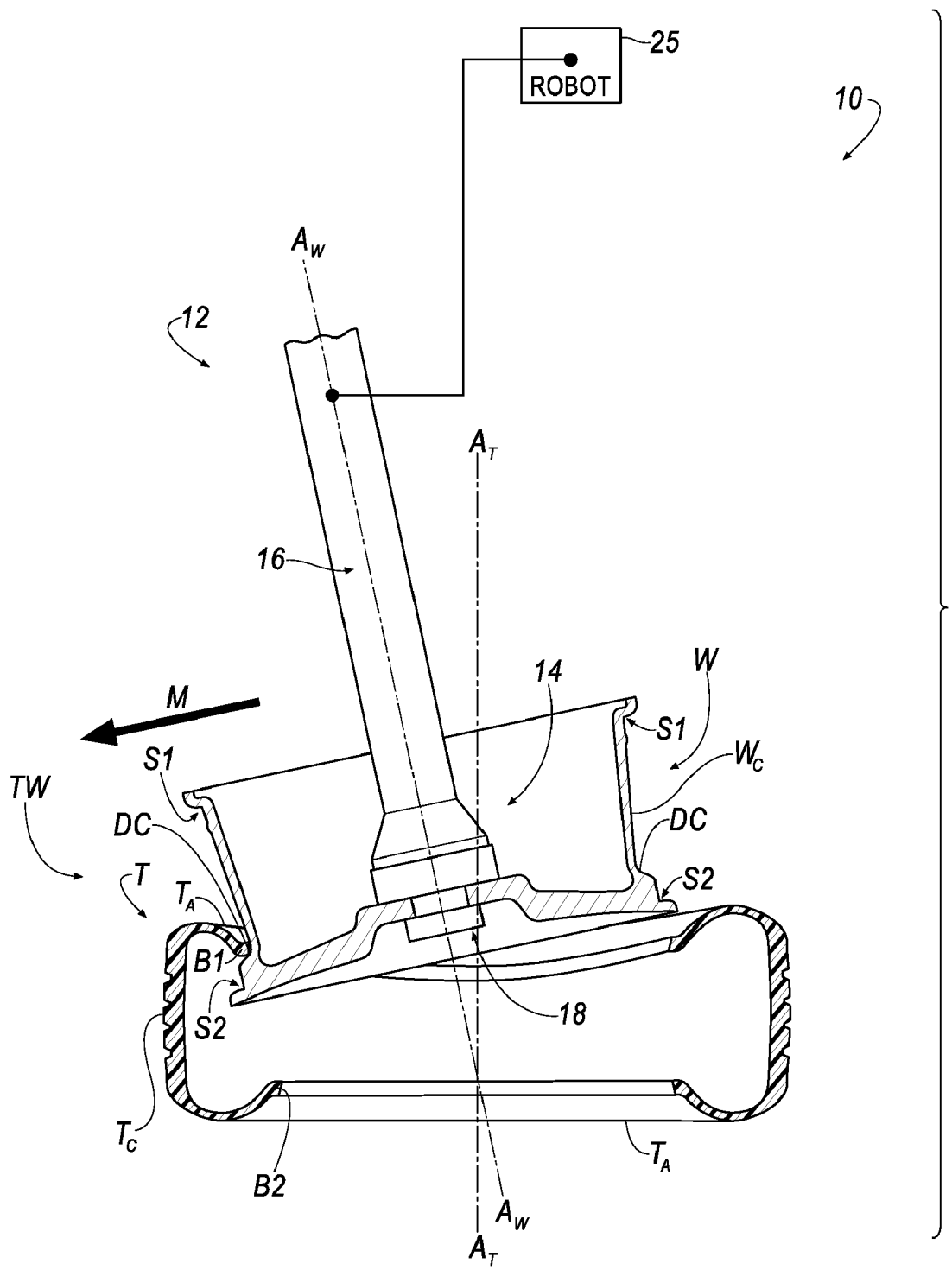
Figure 1D:
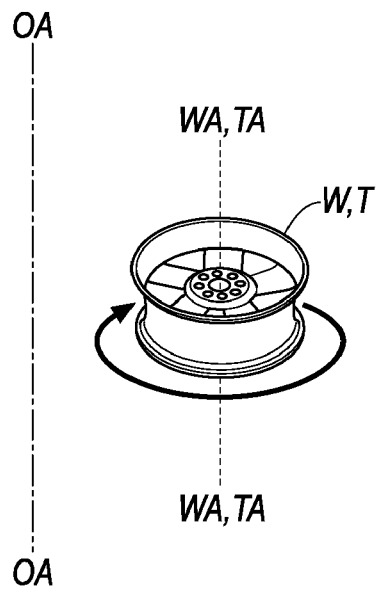
FIGS. 1D-1H depict various exemplary embodiments of revolving and non-revolving movement patterns contemplated by the present invention.
Figure 1E:
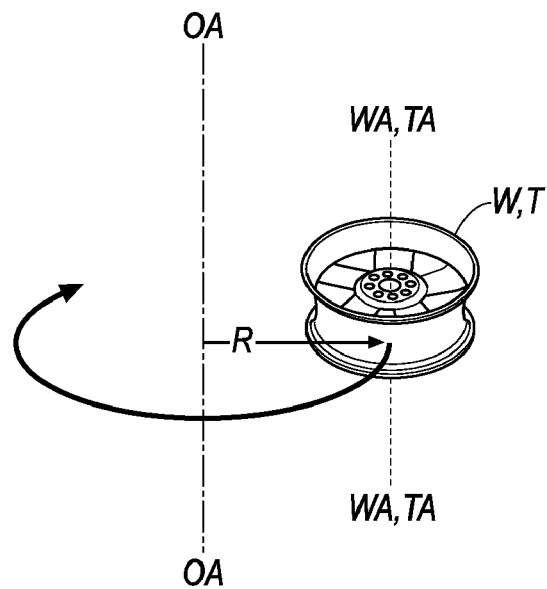
Figure 1F:
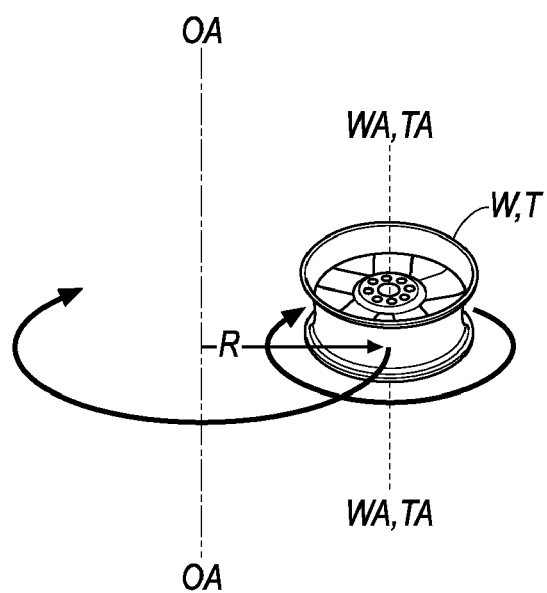
Figure 1G:
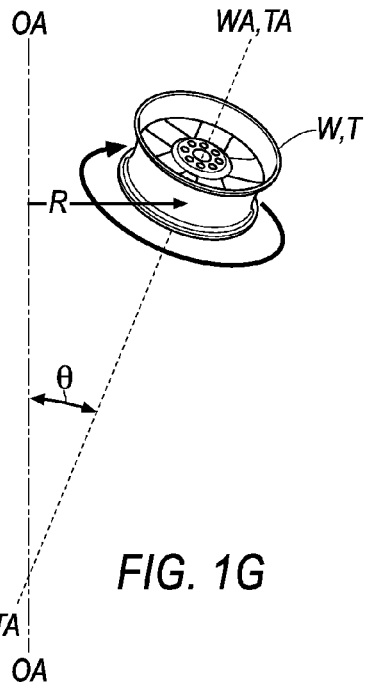
Figure 1H:
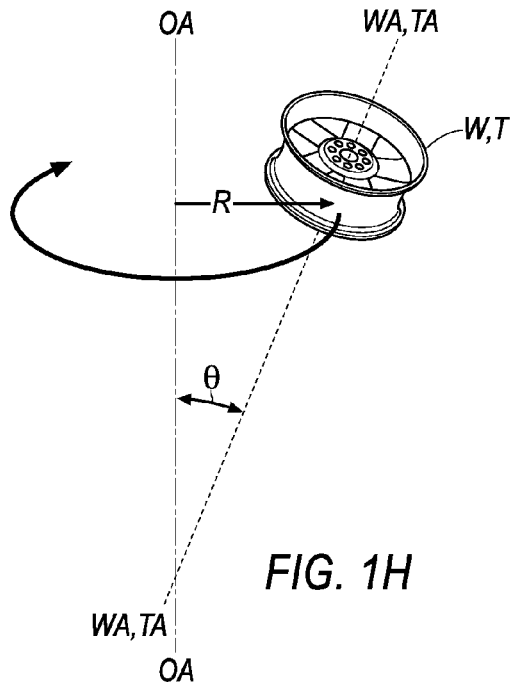
Figure 1I:
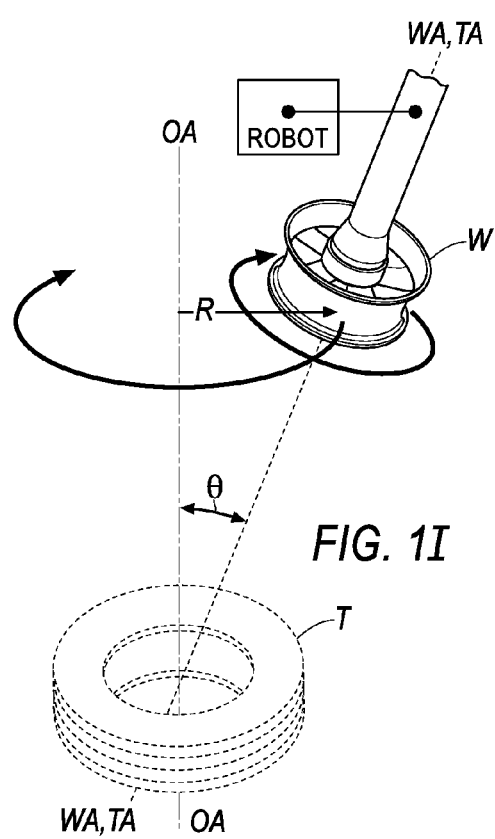
"FIGS. 1I and 1I' illustrate a series of steps for mounting a vehicle tire and a vehicle wheel in accordance with an exemplary embodiment of the invention."
Figure 1I:
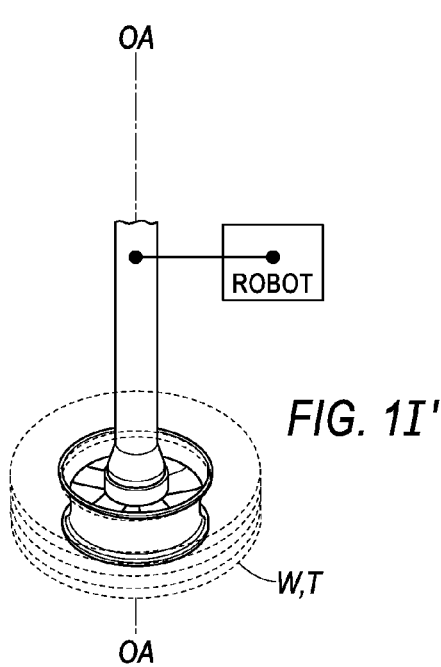
Figure 1J:
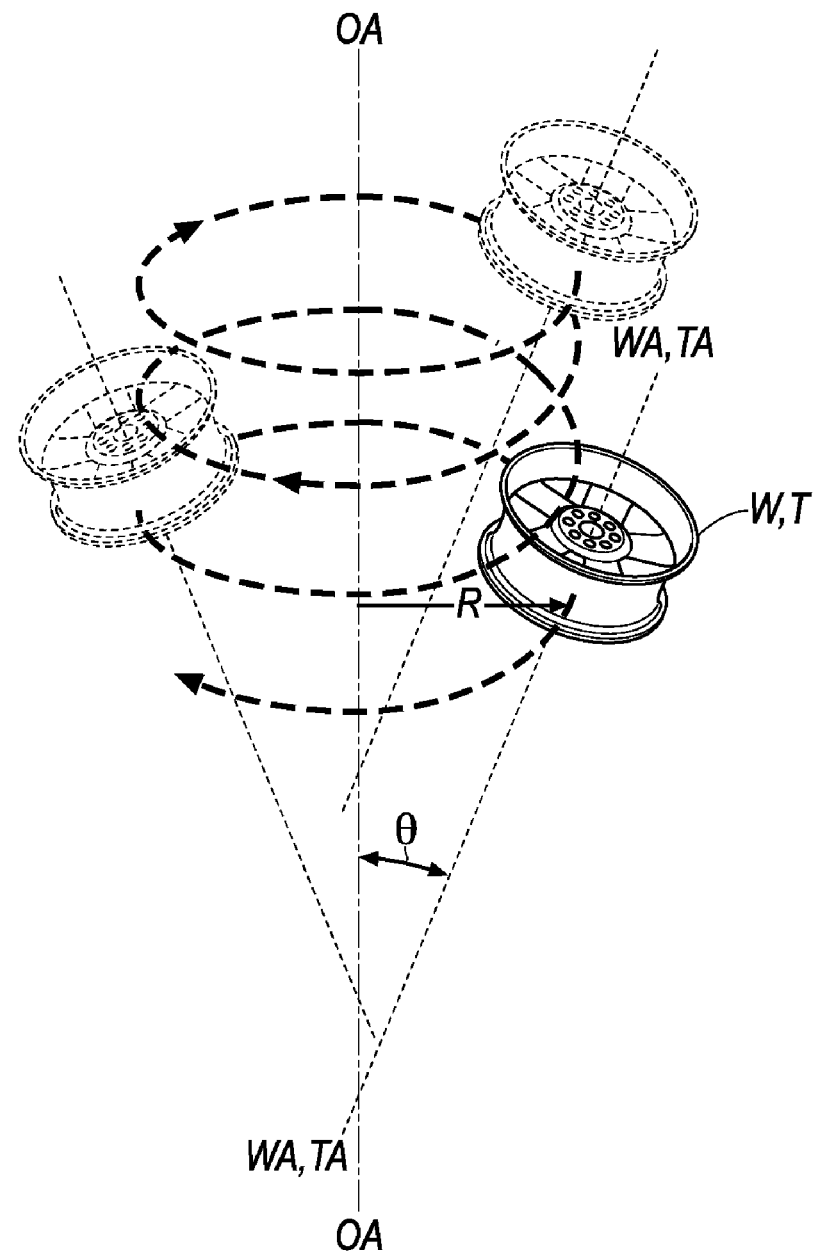
"FIG. 1J depicts an exemplary embodiment of a revolving movement pattern contemplated by the present invention."
Figure 3:
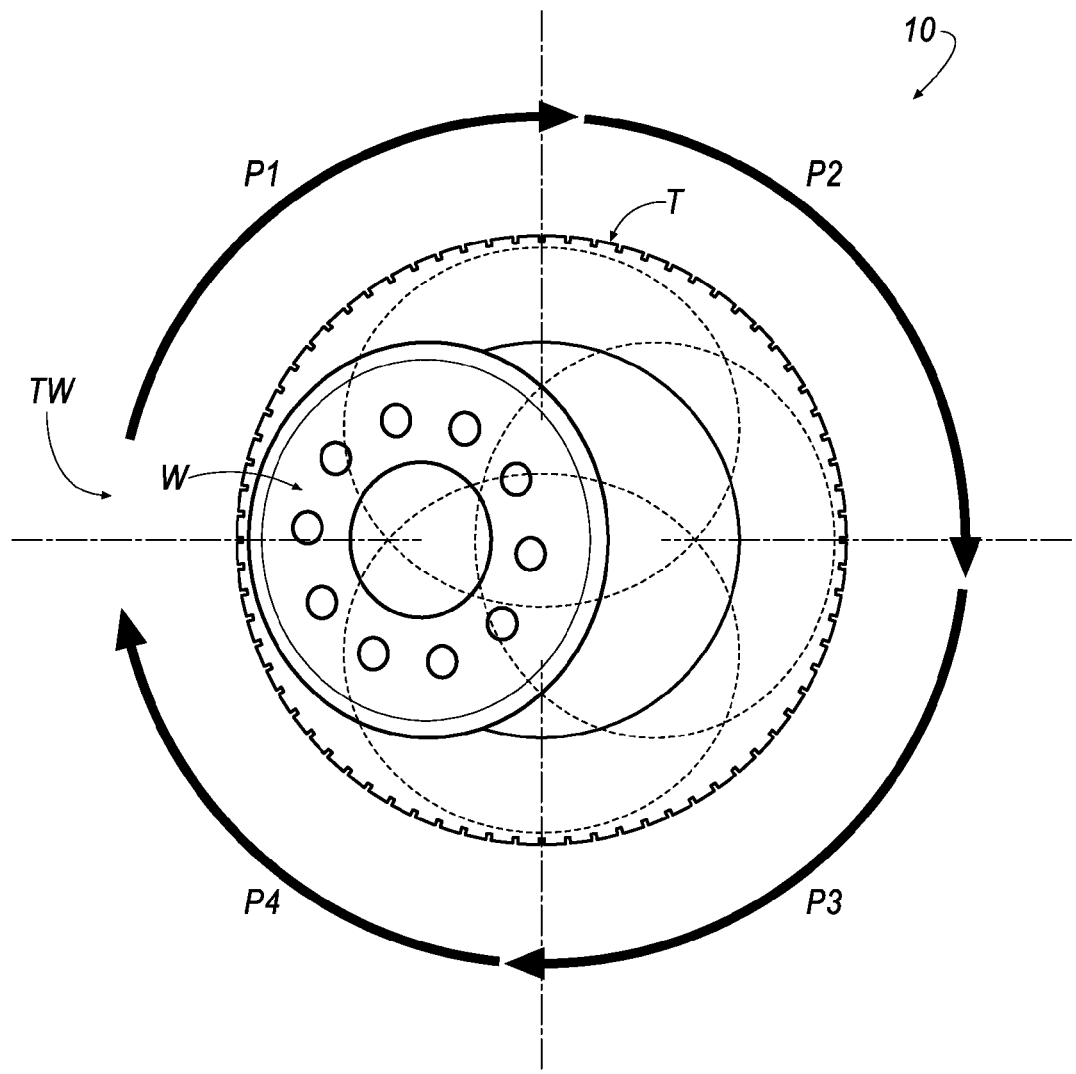
FIG. 3 illustrates a top view of the series of steps for mounting a vehicle tire and a vehicle wheel according to FIGS. 2A-2D.

In an embodiment, a "partial" mounting of a tire, T, and a wheel, W, may include one of the beads, B1, B2, of the tire, T, being partially or fully disposed about the circumference, $W_C$, of the wheel, W (see, e.g., FIGS. 1C and 3). In an embodiment, a "full" mounting of a tire, T, and a wheel, W, may include one of the beads, B1, B2, of the tire, T, being fully disposed about the circumference, $W_C$, of the wheel, W (see, e.g. FIGS. 4D and 6). In an embodiment, a "full" mounting of a tire, T, and a wheel, W, may also include both of the beads B1, B2, of the tire, T, being fully disposed about the circumference, $W_C$, of the wheel, W (see, e.g., FIG. 8). Accordingly, it will be appreciated that the mounting of a tire, T, and a wheel, W, may include the partial or full locating of one or more beads, B1, B2 about the circumference, $W_C$, of the tire, T, and that the tire, T, and wheel, W, may be passed along for additional processing in a subsequent station (not shown) that may include, for example, the match-marking, inflating, bead seating, uniformity testing, and balancing of the mounted tire-wheel assembly, TW.

Referring initially to FIG. 1A, the system 10 generally includes a master actuator adapted to be coupled to at least one or a tire or a wheel. The master actuator may include actuator 25, a wheel support arm assembly 12 including a rotating actuator 14, which is coupled between a base 16 and a spindle 18. The spindle 18 is coupled to the wheel W, for example, to the central hub portion of the wheel, W.

As illustrated, the tire, T, includes a first bead, B1, and a second bead, B2. An axis, $A_T$-$A_T$, extends through a center or rotational axis of the tire, T. The axis, $A_T$-$A_T$, is hereinafter referred to as a tire axis and it corresponds to the actual rotational axis of the tire (when the tire is mounted to a vehicle axle).

As illustrated, the wheel, W, includes a first bead seat, S1, that is adapted to receive and seat the first bead, B1, and a second bead seat, S2, that is adapted to receive and seat the second bead, B2. It will be appreciated that the entire circumference, $W_C$, of the wheel, W, defines the first and second bead seats, 51, S2.

An axis, $A_W$-$A_W$, may extend through a center point or axis of rotation of the wheel, W. The axis, $A_W$-$A_W$, is hereinafter referred to as a wheel axis. $A_W$-$A_W$ corresponds to the actual rotational axis of the wheel (when the wheel is mounted to a vehicle axle).

The base 16 may be coupled to an actuator, which is shown generally at 25, that is capable of moving the entire wheel support arm assembly 12, and, accordingly, the wheel, W, in three-dimensional space. As illustrated, the wheel axis, $A_W$-$A_W$, extends through the wheel support arm assembly 12, and accordingly, movement of the wheel support arm assembly 12 by way of the actuator 25 also results in the movement of the wheel axis, $A_W$-$A_W$.

In an embodiment, the actuator 25 is capable of moving the wheel support arm assembly 12, to accomplish any combination of motions M such as a generally linear motion, (see, e.g., FIGS. 1A-1C), a precessional motion, P1-P4 (see, e.g., FIGS. 1G-1I, 2A-3), or, in an embodiment, in a plunging motion, P (see, e.g. FIGS. 4A-5D), or, in an embodiment, a non-precessional, rotational motion (see, e.g., FIGS. 7A-7E), in a pendulum motion, in a sinusoidal motion, or any combination thereof. The actuator 25 may be an automated device (such as a robot) that is governed by a processor (not shown), or, alternatively, a manually-operated device that is overseen and physically operated by a person (not shown).

In an embodiment, as shown in FIGS. 1A-1C, in a first step, the support arm assembly 12 is swung, dropped or otherwise moved generally according to the direction of the arrow, M. Motion M may be any motion, or combination of motions (including a linear, a sinusoidal, or a pendulum). As seen in FIG. 1A, the assembly 12 moves the wheel, W, proximate the tire, T. Then, in FIG. 1B, the assembly 12 moves a drop center portion, DC, of the wheel, W, proximate the first bead, B1, of the tire, T. Referring to FIGS. 1C/2A, the assembly 12 moves the drop center portion, DC, of the wheel, W, adjacent the first bead, B1, of the tire, T, such that a portion of the first bead, B1, of the tire, T, is pressed firmly against a portion of the drop center of the wheel, W.

Figure 2A:
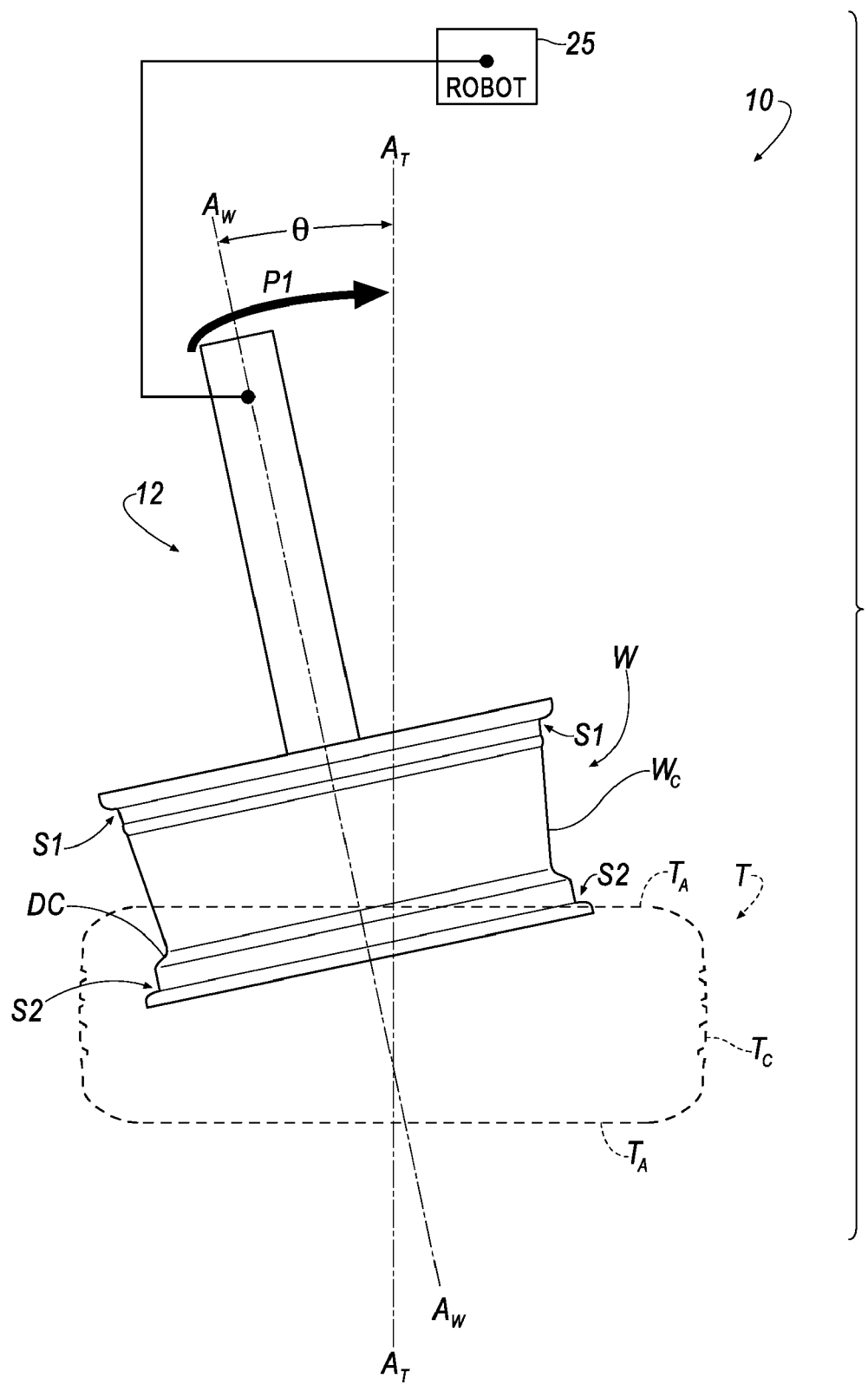
FIGS. 2A-2D illustrate a series of steps for mounting a vehicle tire and a vehicle wheel in accordance with an exemplary embodiment of the invention.

As seen in FIGS. 2A, prior to the actuator 25 causing further movement of the assembly 12 and wheel, W, the actuator 25 locates the wheel, W, relative the tire, T, such that the wheel axis, $A_W$-$A_W$, is canted θ (i.e. not parallel to the tire axis, $A_T$-$A_T$). In an embodiment, the actuator 25 may then move the wheel support arm assembly 12 and, accordingly, the wheel, W, as well as the wheel axis, $A_W$-$A_W$, relative the tire, T, and the tire axis, $A_T$-$A_T$, sweeping out a precessional motion according to the direction of the arrows P1-P4 (FIGS. 2A-3, and 1G). In general, the precessional movement, P1-P4, is defined by canting the wheel axis relative to the tire axis, and then rotating the wheel axis, $A_W$-$A_W$, about the tire axis, $A_T$-$A_T$, such that the movement of the wheel axis, $A_W$-$A_W$, about the tire axis, $A_T$-$A_T$, sweeps out an area that generally defines a surface of a cone. During the precessional movement of W, it may be advantageous with some tire T/wheel W combinations to also rotate wheel W about its own $A_W$-$A_W$ axis FIG. 1H using rotating actuator 14.

Figure 2B:
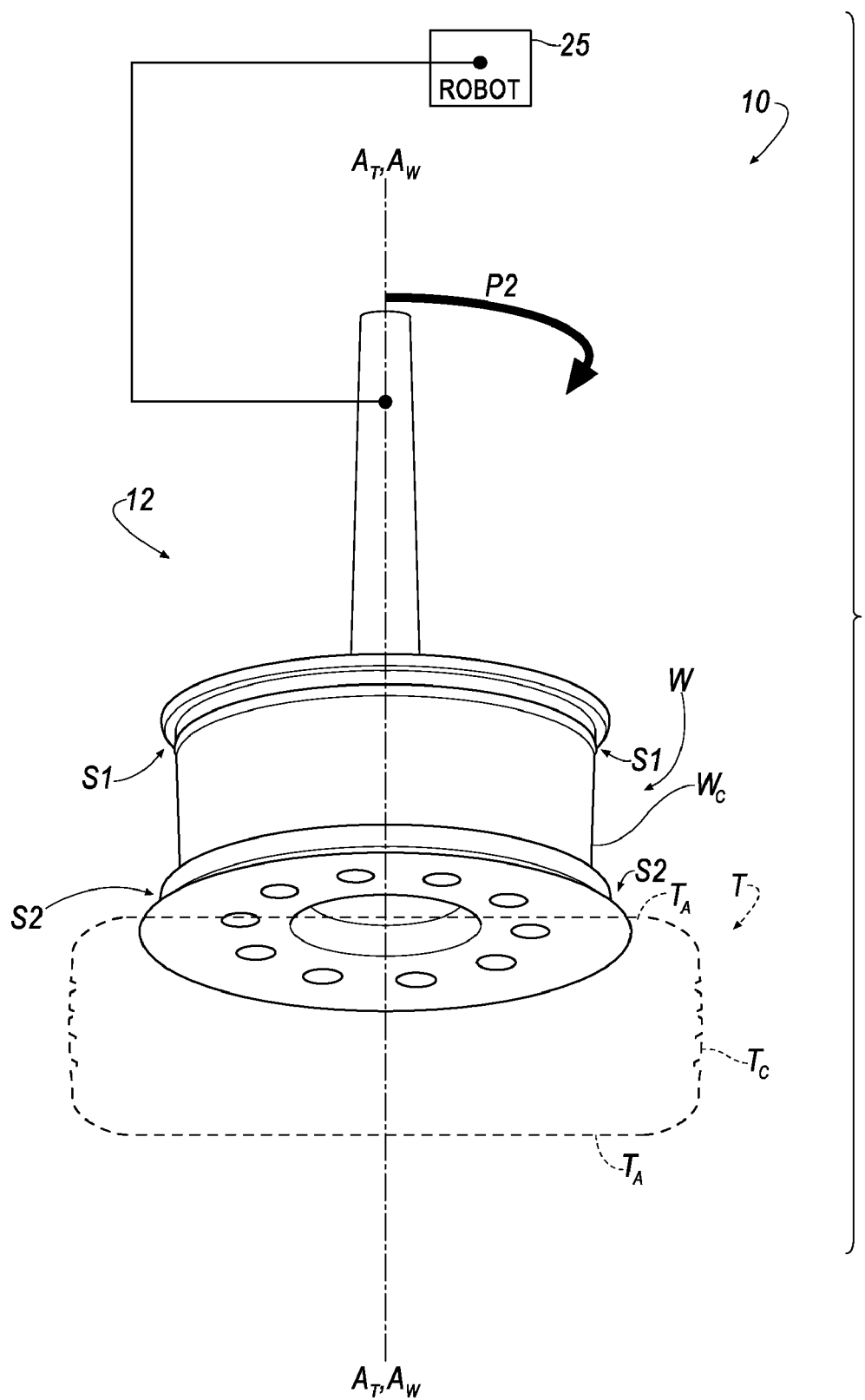
Figure 2C:
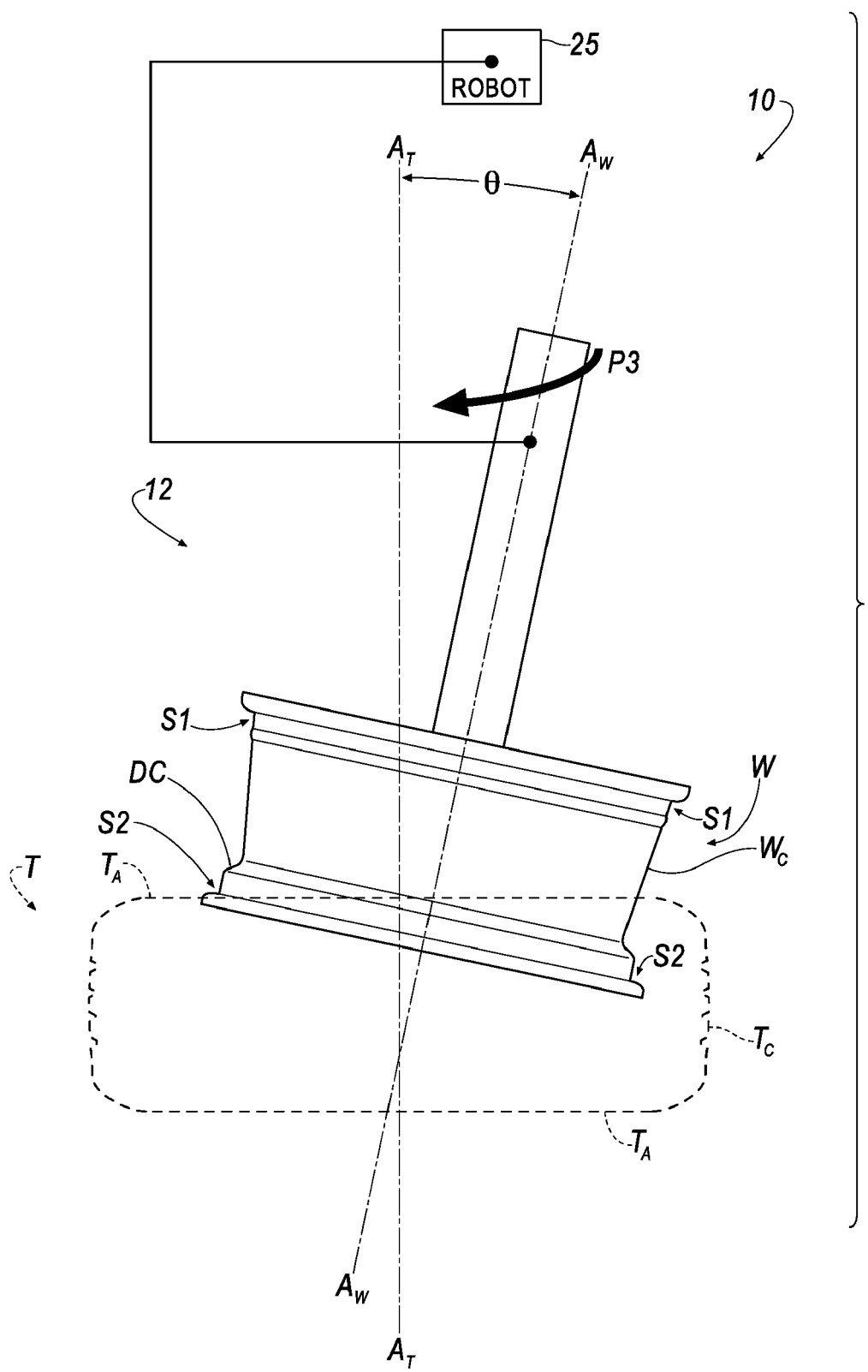
Figure 2D:
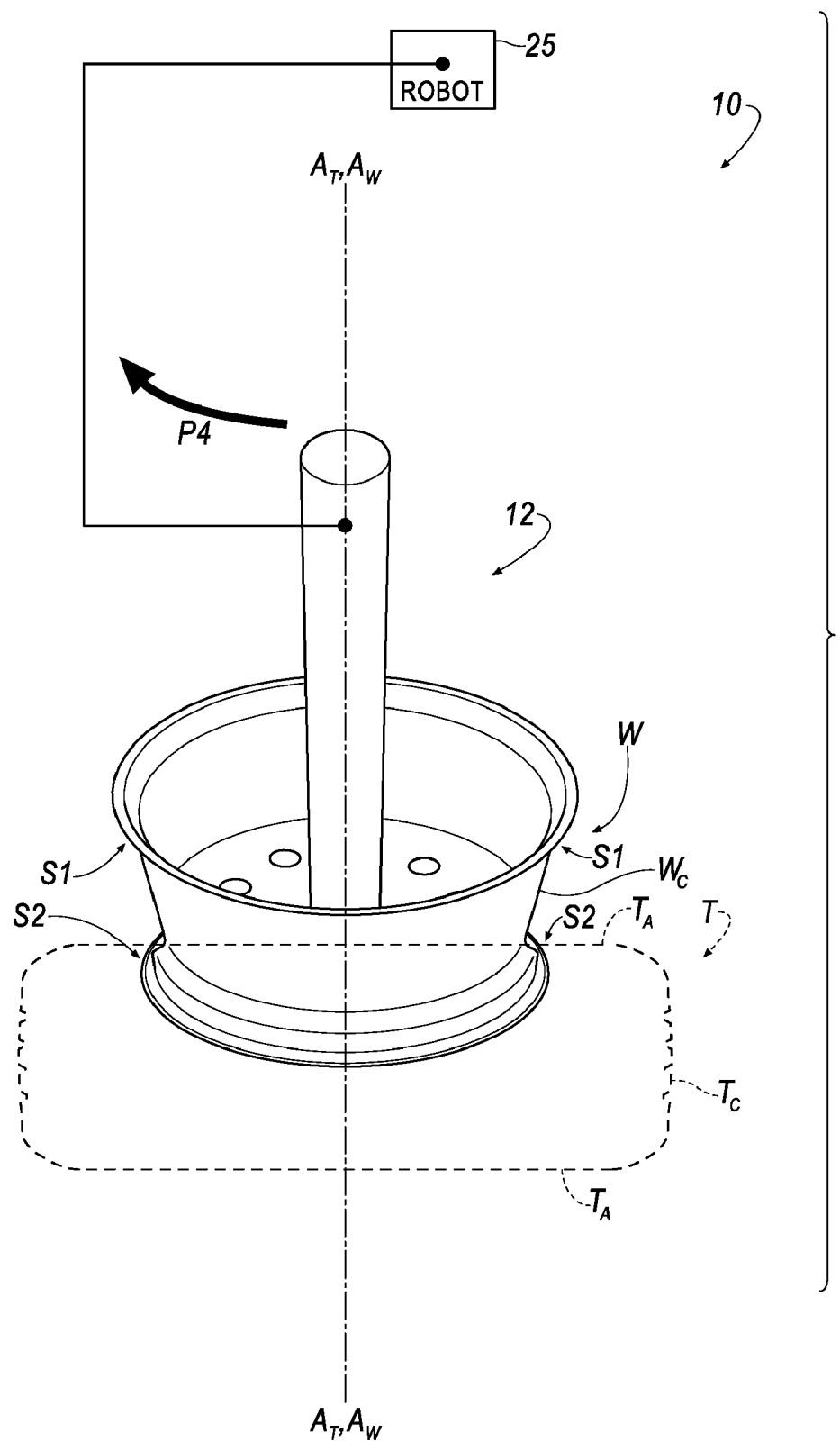

Referring first to FIG. 2A, the actuator 25 may cause the wheel support arm assembly 12 to precessionally locate the wheel, W, relative the tire, T, for example, at the "9 o'clock position" (see, e.g., FIG. 3) for precessional movement of the wheel, W, relative the tire, T, to the "12 o'clock position" (see, e.g., FIG. 3) according to the clockwise direction of the arrow, P1. Then, as seen in FIG. 2B, the actuator 25 may cause the wheel support arm assembly 12 to precessionally locate the wheel, W, relative the tire, T, for example, at the "12 o'clock position" for precessional movement of the wheel, W, relative the tire, T, to the "3 o'clock position" according to the clockwise direction of the arrow, P2. Then, as seen in FIG. 2C, the actuator 25 may cause the wheel support arm assembly 12 to precessionally locate the wheel, W, relative the tire, T, for example, at the "3 o'clock position" for precessional movement of the wheel, W, relative the tire, T, to the "6 o'clock position" according to the clockwise direction of the arrow, P3. Then, as seen in FIG. 2D, the actuator 25 may cause the wheel support arm assembly 12 to precessionally locate the wheel, W, relative the tire, T, for example, at the "6 o'clock position" for precessional movement of the wheel, W, relative the tire, T, to the "9 o'clock position" according to the clockwise direction of the arrow, P4.

Although the movement of the wheel support arm assembly 12 and wheel, W, is described in discreet steps in FIGS. 2A-2D, it will be appreciated that the precessional movement, P1-P4, may be continuous and fluid. In addition, it will be appreciated that the precessional movement, P1-P4, is not limited to a clockwise movement and that the precessional movement, P1-P4, may alternatively be conducted in the counter-clockwise direction. In addition, above references to a particular "o'clock" position of the wheel, W, and/or wheel support arm assembly 12 is made simply for convenience when correlating FIGS. 2A-2D to what is shown in FIG. 3 and that the disclosure is not limited to a particular "o'clock" reference point, starting position or ending position when mounting the tire, T, and wheel, W.

During the precessional movement, P1-P4, as shown and described in FIGS. 2A-3, at least one of the beads, B1, B2, of the tire, T, is drawn over and at least partially located about the circumference, $W_C$, of the wheel, W. In an embodiment, the first bead, B1, may be drawn over and at least partially located proximate the first bead seat, S1. Once the bead, B1, is drawn proximate the bead seat, S1, the wheel axis, $A_W$-$A_W$, and the tire axis, $A_T$-$A_T$, may be substantially co-axial. Thus, the precessional movement, P1-P4, may result in the subsequent partial or full mounting of the tire, T, and the wheel, W. Once the tire, T, is mounted to the wheel, W, the assembled, substantially co-axial tire, T, and wheel, W, may be moved to another station (not shown) for match-marking, inflating, and balancing.

During the above tire/wheel mounting operation, it will be appreciated that the tire, T, may, if desired, be retained by one of its axial end surfaces, $T_A$, or its outer circumference, $T_C$, while the wheel, W, is precessionally moved relative the tire, T, as described above. However, it will be appreciated that there is nothing to prevent the opposite technique from effectively working, namely holding the wheel, W, constant as, the tire, T, is precessionally moved about the wheel, W.

Referring now to FIGS. 4A-5D, a system for mounting a tire, T, and a wheel, W, is shown generally at 100 according to an embodiment. The system 100 is substantially similar to the system 10 in that the system 100 incorporates a precessional movement, P1-P4, of the wheel, W, by way of an actuator 25 and wheel support arm assembly 12; however, the system 100 simultaneously compounds the precessional movement, P1-P4, of the wheel, W, via the movement of the support arm assembly 12 with an axial plunging movement of the support arm assembly 12 along an axis, which is shown generally at, $A_P$-$A_P$. The axis, $A_P$-$A_P$, is hereinafter referred to as a plunging axis.

Figure 4A:
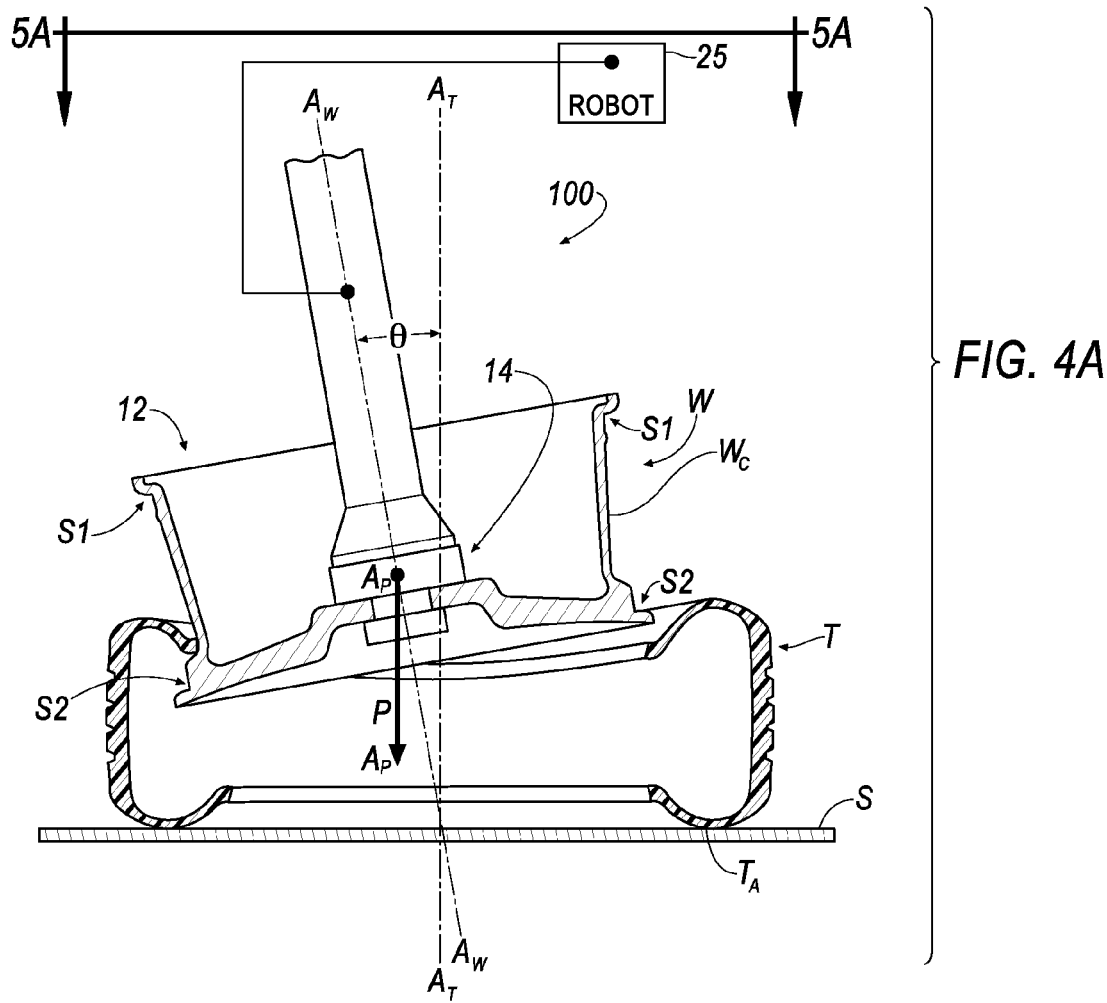
FIGS. 4A-4D illustrate a series of steps for mounting a vehicle tire and a vehicle wheel in accordance with an exemplary embodiment of the invention.
Figure 5A:
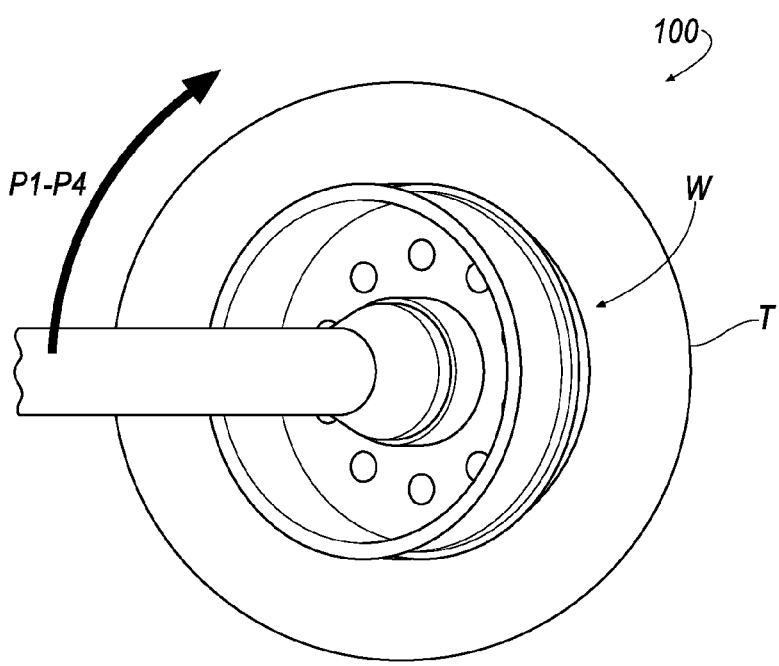
FIGS. 5A-5D illustrate a top view of the series of steps for mounting a vehicle tire and a vehicle wheel according to FIGS. 4A-4D respectively.
Figure 4B:
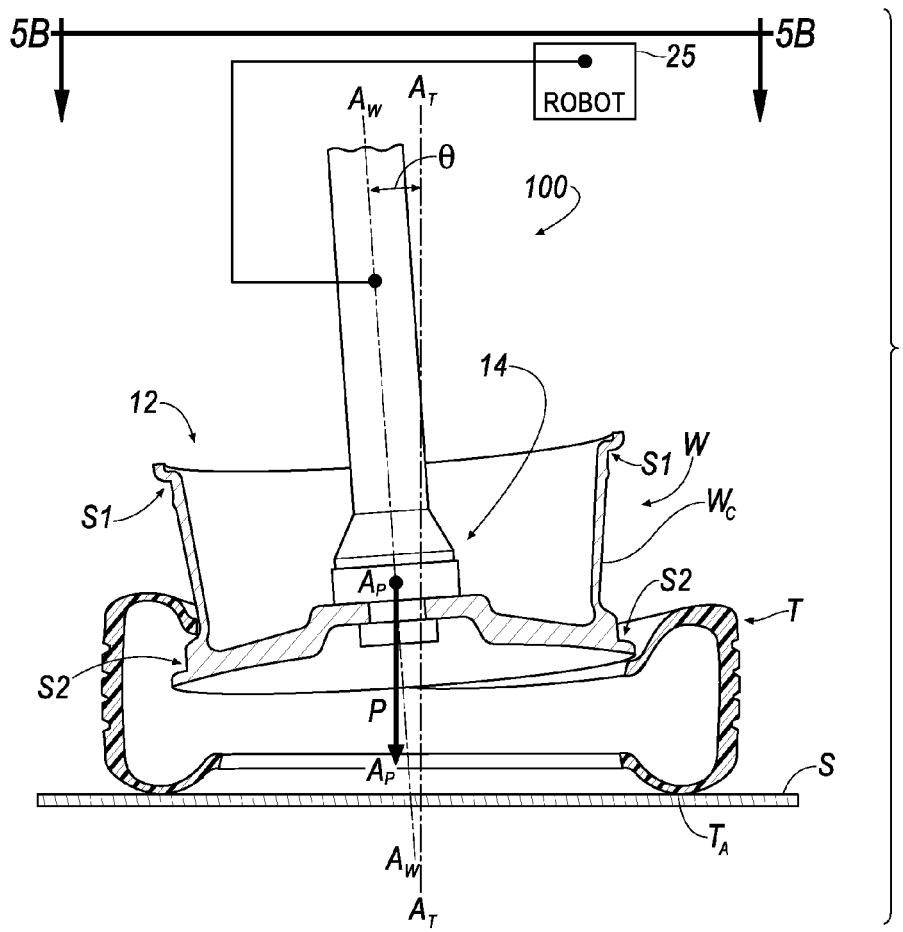
Figure 5B:
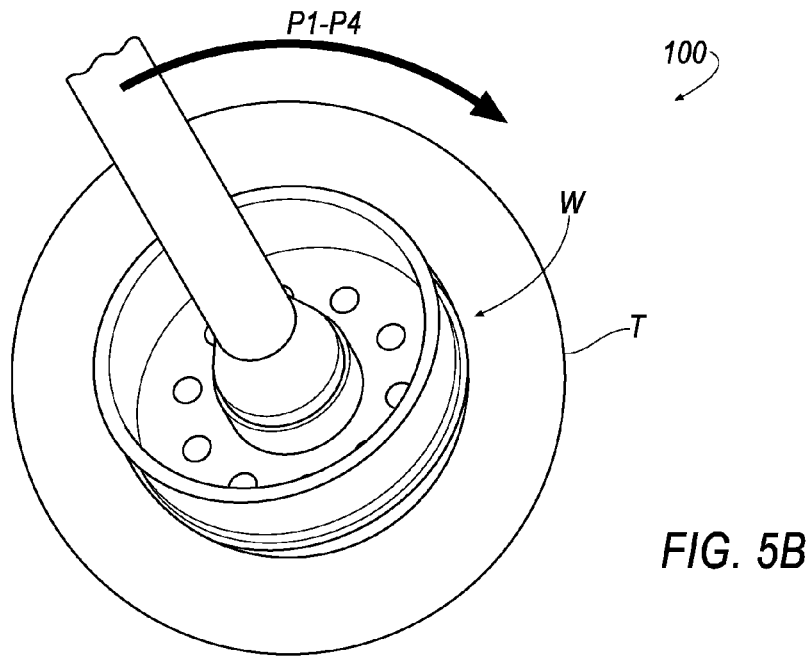
Figure 4C:
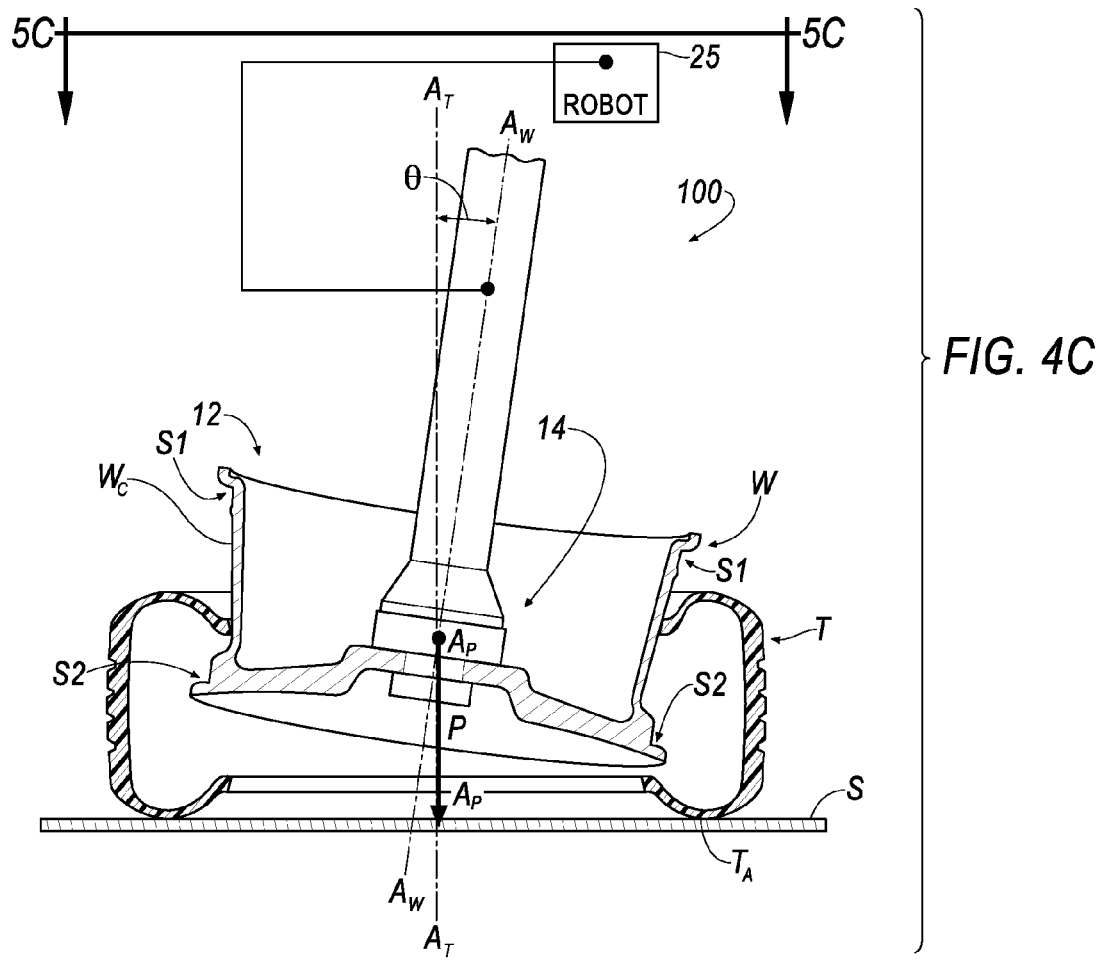
Figure 5C:
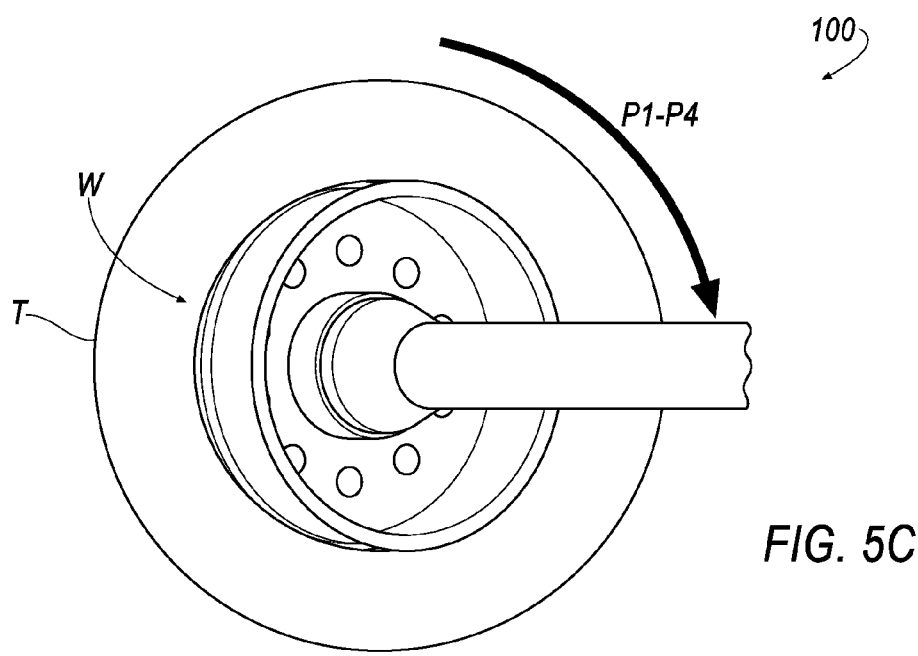

Referring to FIG. 4A, the wheel support arm assembly 12 may be positioned substantially similarly as shown and described in FIGS. 1C/2A. An axial end surface, $T_A$, of the tire, T, may be retained by and is positioned against an axial support surface, S.

As shown in FIGS. 4A-5C, the wheel support arm assembly 12 and wheel, W, may be moved in a simultaneous, compounded motion according to precessional movement as illustrated by arrows, P1-P4, in conjunction with an axial plunging movement according to the direction of arrow, P, along the plunging axis, $A_P$-$A_P$. Although a compounded movement according to the direction of arrows P1-P4 and P are described above, it will be appreciated that the invention is not limited to a compounded movement of the assembly 12 and wheel, W; for example, it will be appreciated that as the wheel, W, is moved in a precessional motion, P1-P4, the tire, T, may be moved axially toward the wheel, W, such that axial movement between the wheel, W, and the tire, T, is accomplished by moving the tire, T, toward the wheel, W. Thus, it will be appreciated that the wheel, W, may be precessionally moved as the tire, T, is axially moved toward the wheel, W. The present invention also contemplates that during the precessional movement of wheel W, it may be advantageous with some tire T, wheel W, combinations to also rotate wheel W about its own $A_W$-$A_W$ axis (using rotational actuator 14)

As seen in each subsequent Figure in FIGS. 4A-4D, as the tire, T, is mounted on to the wheel, W, by way of the compounded motion, P1-P4 and P of the wheel, W, the angular spacing of the wheel axis, $A_W$-$A_W$, and the tire axis, $A_T$-$A_T$, according to angle, θ, may be reduced to approximately zero such that the wheel axis, $A_W$-$A_W$, and the tire axis, $A_T$-$A_T$, converge upon one another and become substantially co-axial.

Figure 4D:
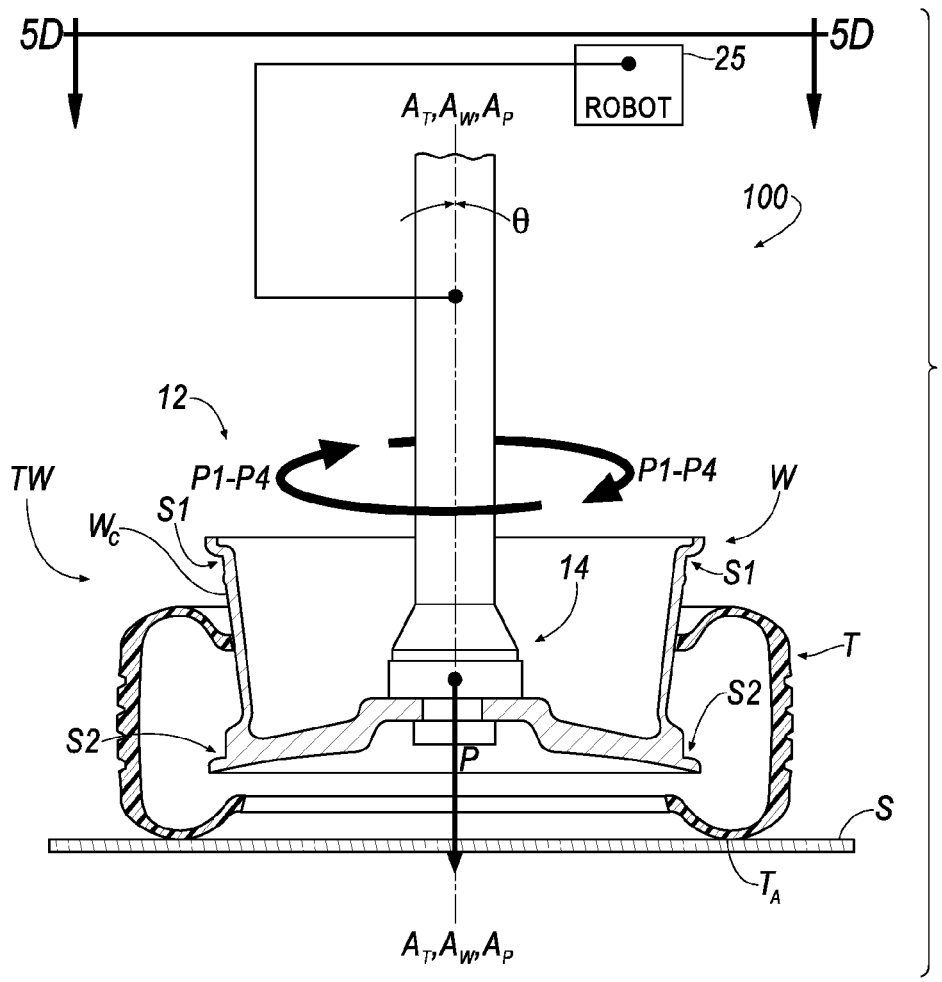
Figure 5D:
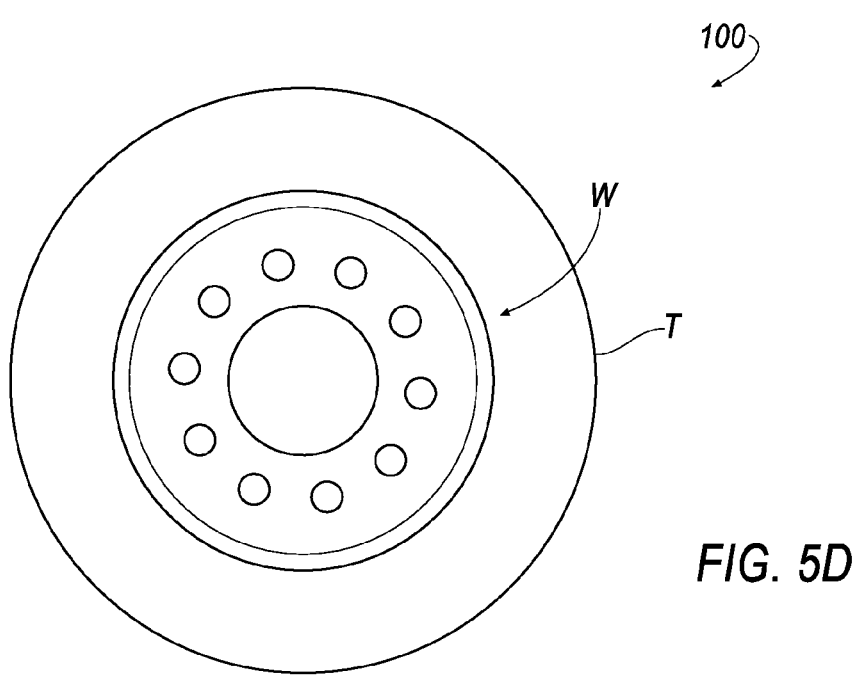
Figure 6:
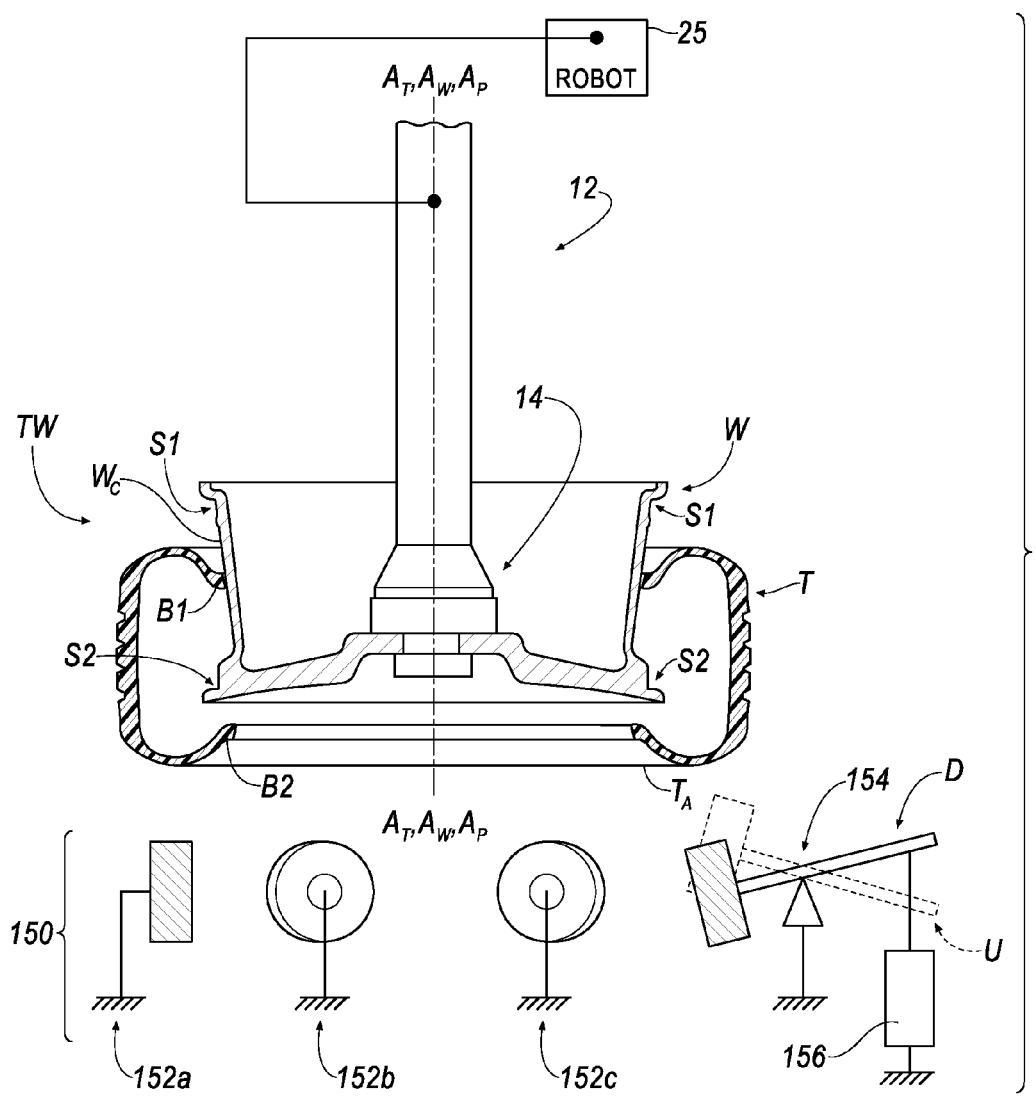
FIG. 6 illustrates an environmental view of a system for mounting a vehicle tire and a vehicle wheel in accordance with an exemplary embodiment of the invention.

As seen in FIGS. 4D and 5D, the tire, T, may be at least partially mounted to the wheel, W, such that the first bead, B1, is located about the circumference, $W_C$, of the wheel, W. Referring to FIG. 6, the wheel support assembly 12 may move the partially-mounted tire, T, relative the wheel, W, to a finishing station, which is shown generally at 150. Finishing station 150 is effective for mounting second bead B2 about the circumference, $W_C$, of the wheel, W.

In an embodiment, the finishing station 150 generally includes a plurality of grounded rollers, which are shown generally at 152a-152c, and one or more repositional rollers. Repositional roller can be a pivoting "see-saw" roller assembly which is shown generally at 154. The see-saw roller 154 is in communication with an actuator 156 to permit a pivoting up/down "see-saw" movement of the see-saw roller 154. In an embodiment, the grounded rollers 152a-152c and the see-saw roller 154 are disposed about a circumference, $W_C$, of an axial end, $T_A$, of the tire, T. In an embodiment rollers 152a-152c and 156 are free to rotate about their own respective axis of rotation but they are passive (i.e. they are not capable of doing any positive work on tire T).

In an embodiment, the grounded roller 152a is circumferentially positioned substantially opposite that of the see-saw roller 154. Although only three grounded rollers 152a-152c are shown, it will be appreciated that any desirable number of grounded rollers 152a-152c may be included in the design of the finishing station 150.

Figure 7A:
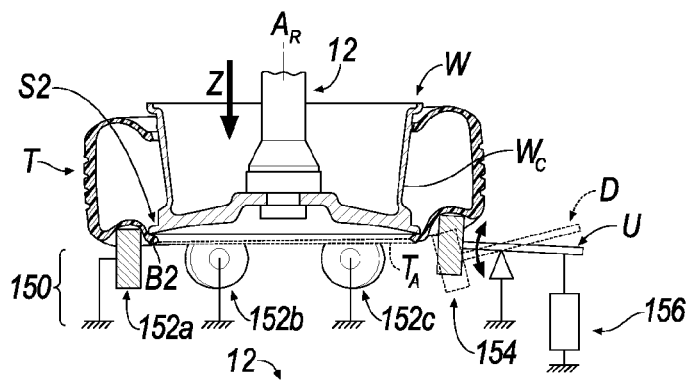
FIGS. 7A-7E illustrate a series of steps for mounting a vehicle tire and a vehicle wheel according to the system shown in FIG. 6.

In operation, referring to FIG. 7A, the wheel support assembly 12 moves the partially-mounted tire, T, and wheel, W, toward the finishing station 150 according to the direction of the arrow, Z, such that the axial end, $T_A$, of the tire, T, contacts the grounded rollers 152a-152c and see-saw roller 154. Then, the actuator 156 moves the see-saw roller 154 from a down position, D, to an up position, U, so as to urge at least a portion of the axial end, $T_A$, of the tire, T, in a direction away from the grounded rollers 152a-152c.

Figure 7B:
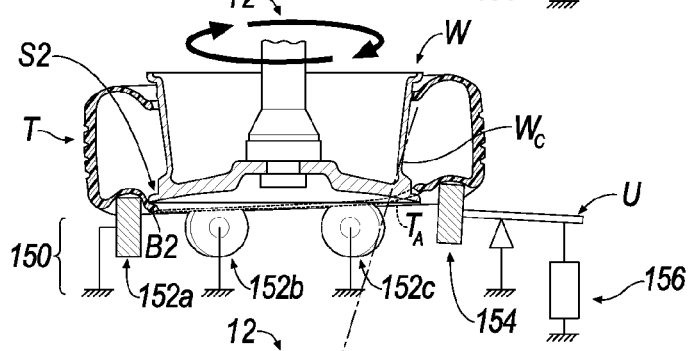

Referring to FIG. 7B, at least one of the wheel support assembly 12 or the rotating actuator 14 rotates the partially mounted tire, T, and wheel, W, about an axis, $A_R$-$A_R$, which is substantially co-axial to the axes, $A_T$-$A_T$, $A_W$-$A_W$. The axis, $A_R$-$A_R$, is hereinafter referred to as a finishing station rotation axis. Because the axial end, $T_A$, of the tire, T, is brought in contact with the grounded rollers 152a-152c and see-saw roller 154, the rotational movement of the wheel support assembly 12 is translated from the wheel, W, and tire, T, to the grounded rollers 152a-152c and see-saw roller 154.

As the partially mounted tire, T, and wheel, W, begin to rotate about the finishing station rotation axis, $A_R$-$A_R$, the up positioning, U, of the see-saw roller 154 urges the second bead, B2, to begin to be partially disposed about the circumference, $W_C$, of the wheel, W, proximate the see-saw roller 154 (see, e.g., FIG. 7B). At this position, it may be said that the second bead, B2, is approximately 5% disposed about the circumference, $W_C$, of the wheel, W.

Figure 7C:
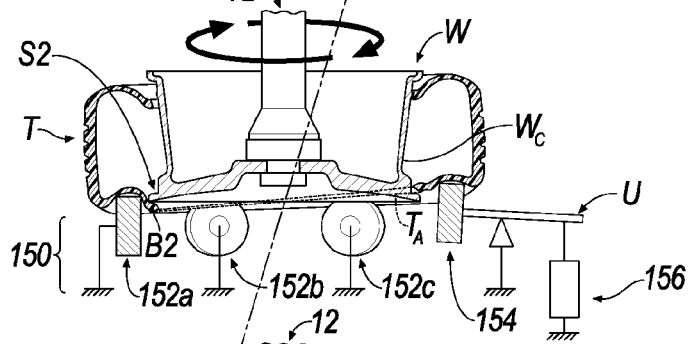

Then, as seen in FIG. 7C, upon further rotational movement of wheel, W the second bead, B2, begins to "thread" itself onto the wheel (much like a nut is rotated when it is joined to a threaded shaft) further partially disposing it about the circumference, $W_C$, of the wheel, W, proximate the grounded roller 152c, which is closest to the see-saw roller 154. If desired, the actuator 156 may increase the up positioning, U, of the see-saw roller 154 so as to further urge the second bead, B2, about the circumference, $W_C$, of the wheel, W. At this position, it may be said that the second bead, B2, is approximately 10% disposed about the circumference, $W_C$, of the wheel, W.

Figure 7D:
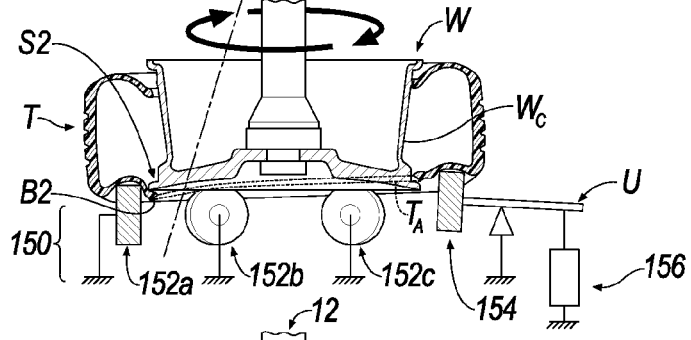

Then, as seen in FIG. 7D, upon further rotational movement of wheel, W, the second bead, B2, is yet further partially disposed about the circumference, $W_C$, of the wheel, W, proximate the grounded roller 152b, which is further away from the see-saw roller 154 than that of the grounded roller 152c, but closer to the see-saw roller 154 than that of the grounded roller 152a. If desired, the actuator 156 may further increase the up positioning, U, of the see-saw roller 154 so as to further urge the second bead, B2, about the circumference, $W_C$, of the wheel, W. As this position, it may be said that the second bead, B2, is approximately 15% disposed about the circumference, $W_C$, of the wheel, W.

Figure 7E:
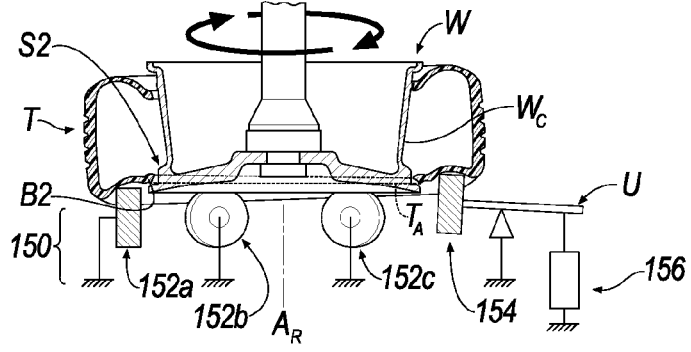
Figure 8:
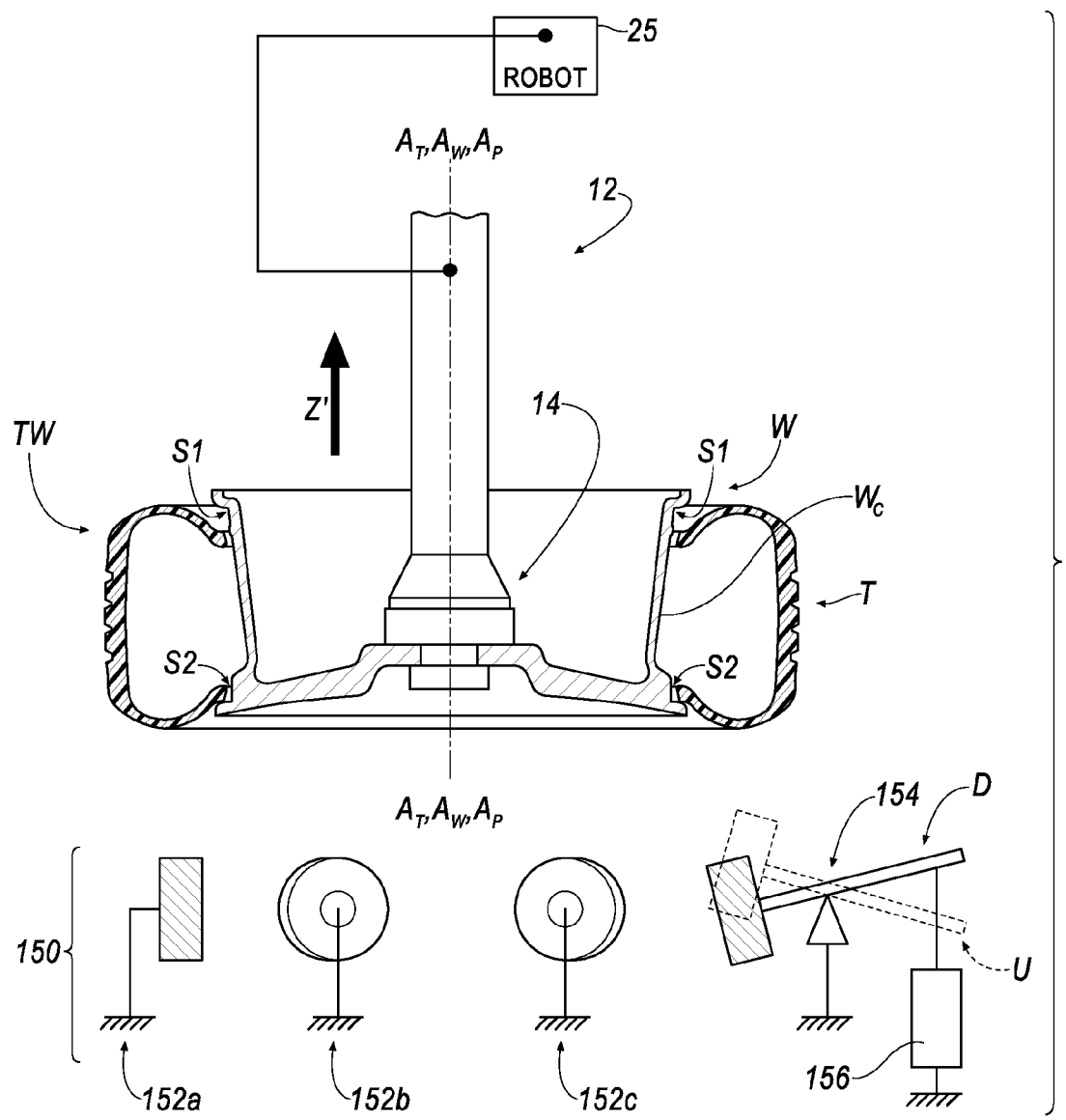
FIG. 8 illustrates an environmental view of the system of FIGS. 6-7D that mounted a vehicle tire and a vehicle wheel.

Then, as seen in FIG. 7E, the second bead, B2, may suddenly become fully disposed about the circumference, $W_C$, of the wheel, W, such that the second bead, B2, is disposed about the circumference, $W_C$, of the wheel, W, proximate the grounded roller 152a that is farthest away from the see-saw roller 154. Because the partially disposed second bead, B2, becomes exponentially disposed about the wheel, W (i.e., percentage of the second bead, B2, being disposed about the circumference, $W_C$, of the wheel, W, rises from 15% to 100%), a snap or pop may be heard such that an operator knows that the second bead, B2, has fully transitioned across the outer periphery of wheel W and is disposed about the circumference, $W_C$, of the wheel, W. Referring to FIG. 8, the wheel support assembly 12 is then moved according to the direction of the arrow, Z', opposite that of the arrow, Z, to move the mounted tire-wheel assembly, TW, away from the finishing station 150 for further processing at one or more subsequent match-marking/inflating/bead seating/balancing station(s).

Figure 9A:
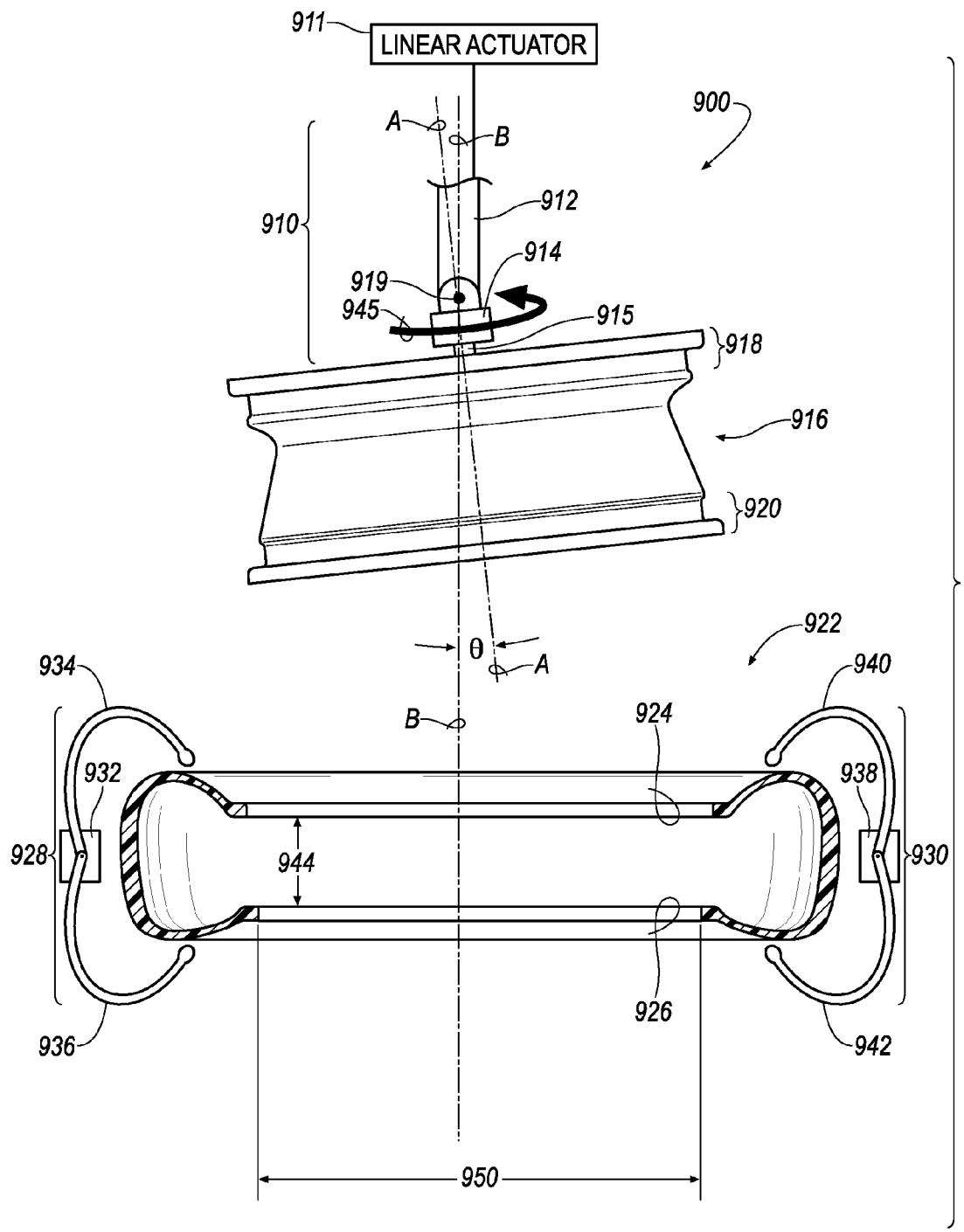
FIG. 9A is yet another embodiment of the system of the present invention showing a vehicle tire in a non-pinched orientation.

Now referring to FIG. 9A, in yet a further embodiment wheel 916 is fixed to wheel support arm assembly 910. Wheel support arm assembly 910 may include rotating actuator 914 (such as a motor or the like) which is coupled between base 912 and spindle 915. Optionally, pivot joint 919 may be interposed between base 912 and rotating actuator 914. Spindle 915 is coupled to the central hub portion of wheel 916 in a manner which is well known to those skilled in the art. Base 912 may be coupled to a linear actuator 911 such that linear actuator is capable of moving the entire wheel support arm assembly 910 parallel to first axis B. Axis B may be generally coincident with the axis of rotation of tire 922. Pivot join 919 may be used to pivot rotating actuator 914 relative to base 912 such that the axis of rotation A of rotating actuator 914 is adjustable with respect to axis B. Axis A may be adjusted to be coincident with axis B (i.e. θ=0°), or in an alternative embodiment, axis A may be angularly oriented (i.e. θ≠0°) with respect to axis B (angular orientation depicted as θ herein and will also be known as the angle of approach). Rotating actuator 914 can be any prime mover, including, for example, an electric, pneumatic, hydraulic, or other type of rotating actuator and is adapted to rotate wheel 916 about axis A. Tire 922 includes first tire bead 924 and second tire bead 926. When tire 922 is in an uncompressed state, bead 924 and 926 are typically separated by gap 944. At least one bead compression mechanism 928 is located proximate to a sidewall portion of tire 922. In the embodiment of FIG. 9A, two bead compression mechanisms 928, 930 are shown; however, it is contemplated within the scope of this invention that one or more bead compression mechanisms may be used. Each bead compression mechanism 928, 930 includes a respectively associated compression actuator 932, 938 which is, in turn, is coupled to respectively associated top pinching fingers 934, 940 and bottom pinching fingers 936, 942. Now referring to FIGS. 9A and 9B, in order to mount wheel 916 to tire 922, wheel 916 is first mounted to spindle 915 wherein it is rotated 945 about axis A by actuator 914. Also, at least one bead compression mechanism 928, 930 is activated thereby pressing together at least a portion of the bead 924, 926 of wheel 922 such that at least a portion of gap 944 is diminished 944' over that of its relaxed state (relaxed state shown in FIG. 9A).

Figure 9B:
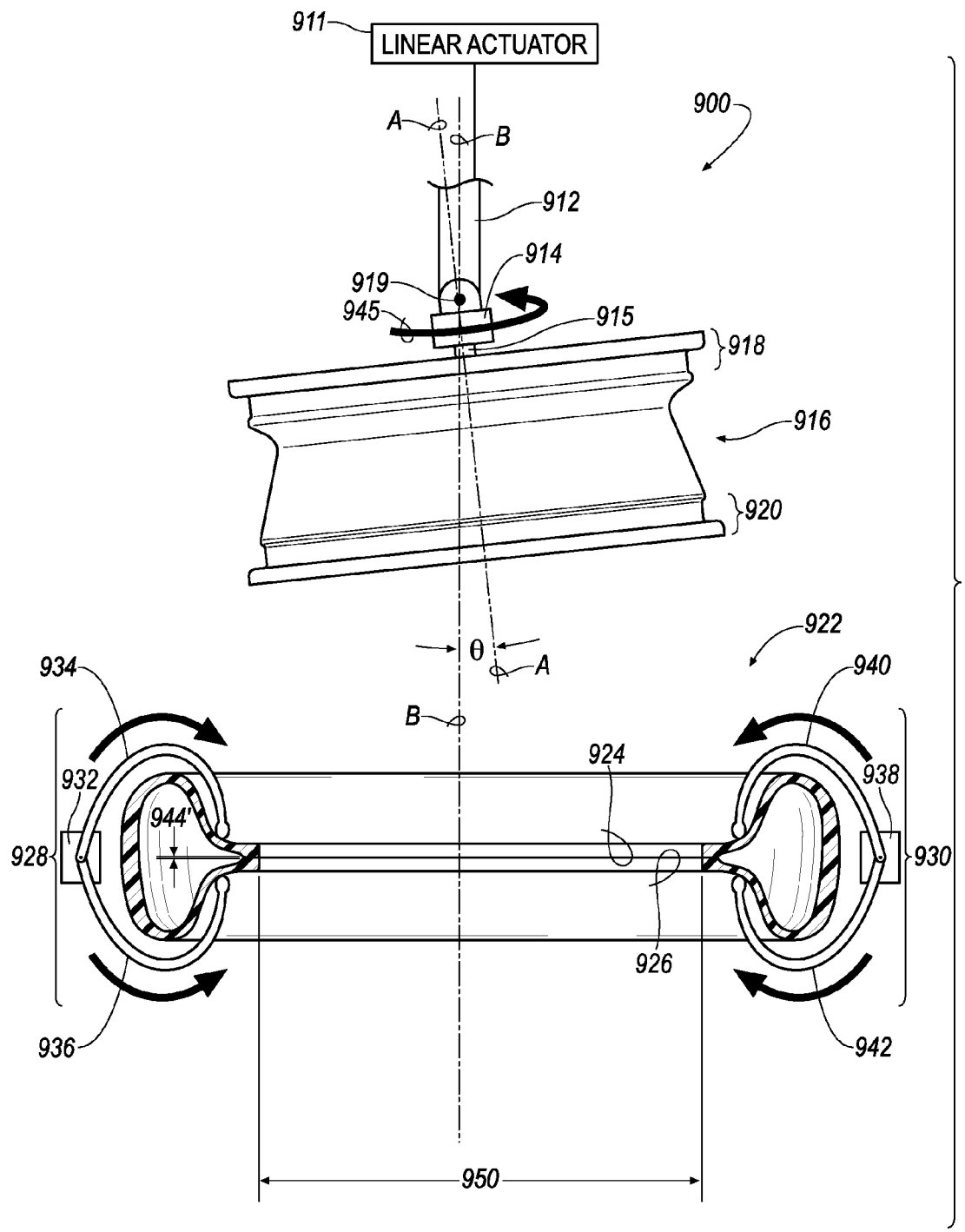
FIG. 9B is the system of FIG. 9A showing a tire bead in a pinched position.
Figure 9C:
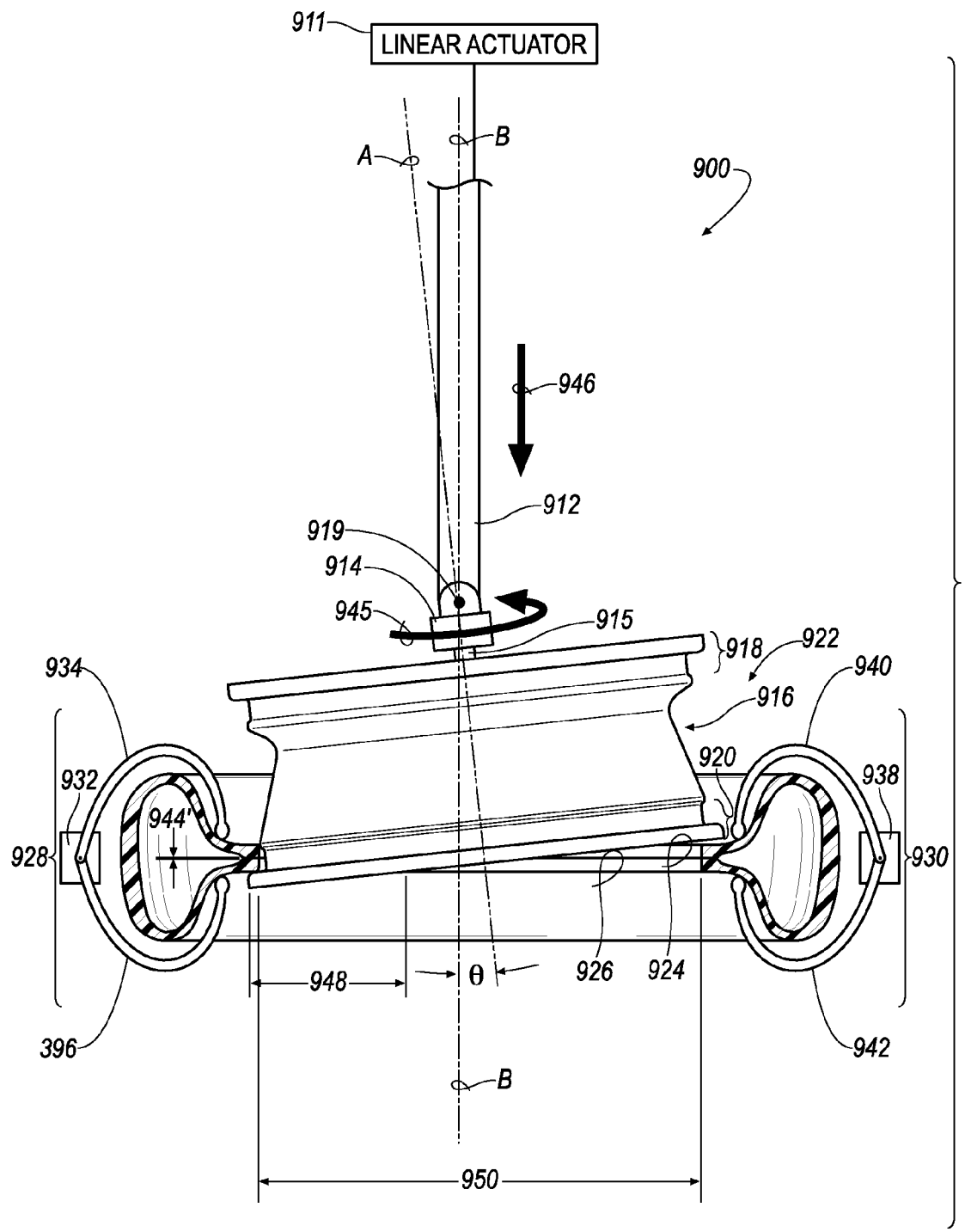
FIG. 9C is the system of FIG. 9A showing the tire bead maintained in a pinched position wherein a vehicle wheel is rotated about a first axis and urged along a second axis into the pinched bead seat area of a vehicle tire.
Figure 9D:
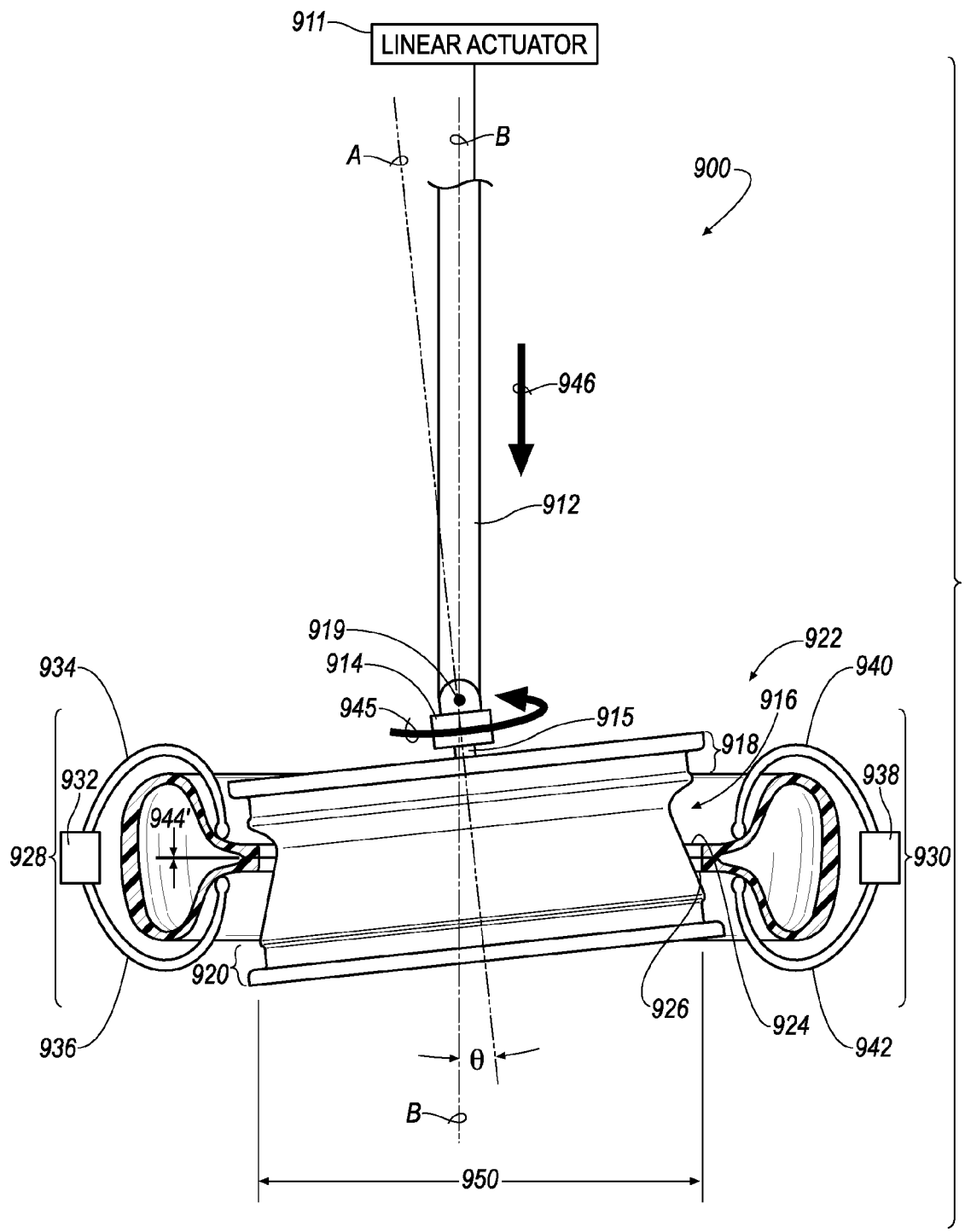
FIG. 9D is the system of FIG. 9A wherein a first bead of a tire wheel has passed completely through an opening formed by the pinched portion of a tire bead.

Now referring to FIGS. 9A, 9B, and 9C, next base 912 is moved linearly 946 along axis B thereby causing at least a portion 948 of second bead seat 920 of wheel 916 to pass through opening 950 formed by first and second bead 924, 926 of tire 922. Next, linear movement 946 continues along axis B such that the entire second bead seat 920 of wheel 916 passes through opening 950 (see Figure D). Once the wheel 916 has assumed the position shown in FIG. 9D, actuators 932, 938 are released and the tire/wheel assembly is disconnected from spindle 915 and moved to the next stage of operation (such as tire inflation, balancing, and the like). The angle of attack θ may be critical for some tire wheel combinations while for other tire wheel combinations it might not be critical at all. For example, in some tire wheel combinations where the tire material is highly compliant (i.e. easily flexible), a non-existent angle of attack (i.e. θ=0°) or a very small θ may be sufficient to accomplish mounting wheel 916 to tire 922. In contrast, tires which are fabricated from materials which are thicker or more resilient may necessitate using a more steeper angle of attack such as ten degrees, twenty degrees, or more. Also, it is contemplated that a lubricant placed on one or more tire beads 924, 926 or one or more wheel portions (such as bead seats 918, 920) may facilitate the installation process and prevent any adverse scoring or tearing of the first and second bead 924, 926 of tire 922 by virtue of the frictional contact made between tire and wheel during the installation process.

Figure 10A:
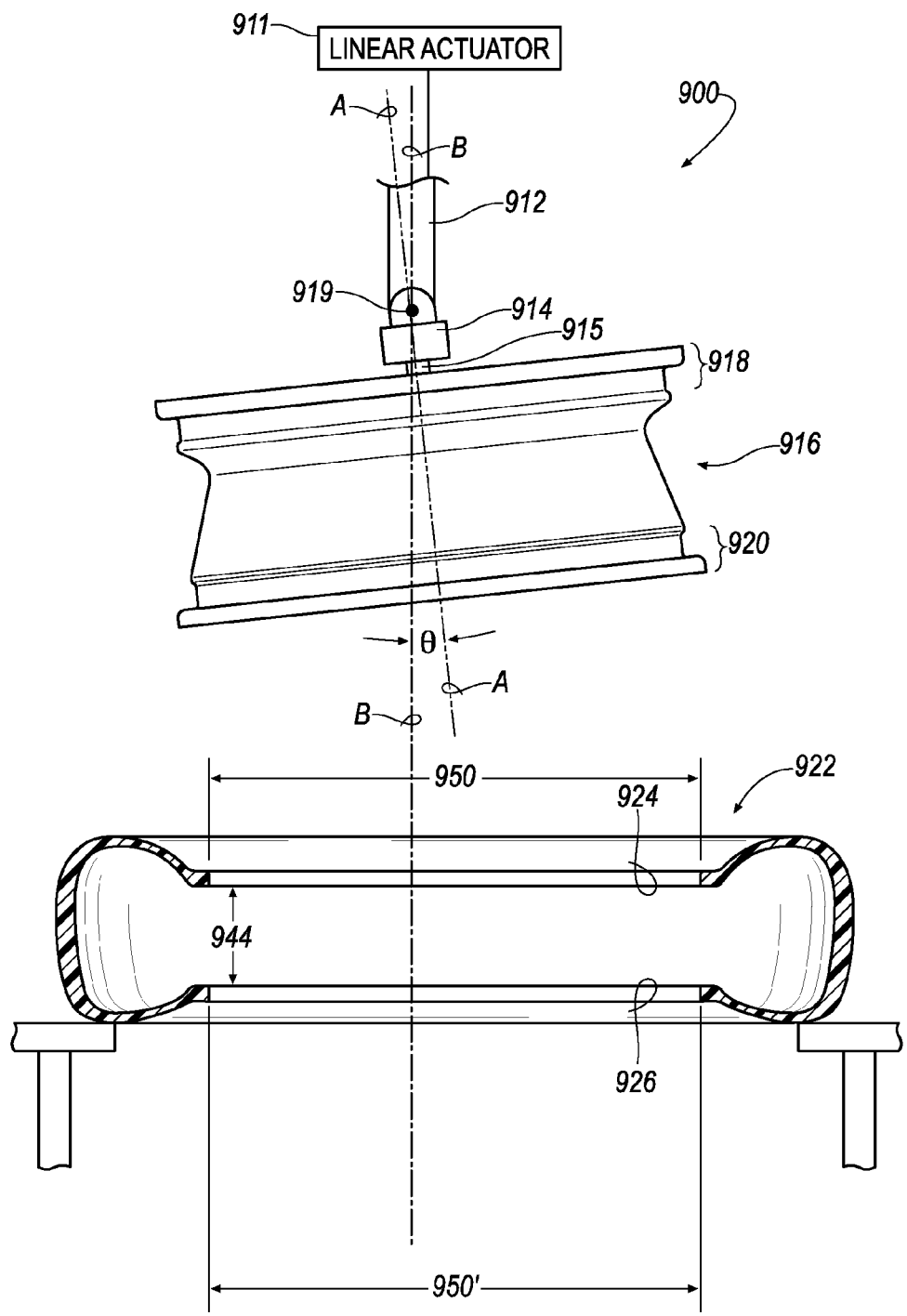
FIG. 10A is a still a further embodiment of the present invention wherein a vehicle wheel is rotated about a first axis while being urged along a second axis.
Figure 10B:
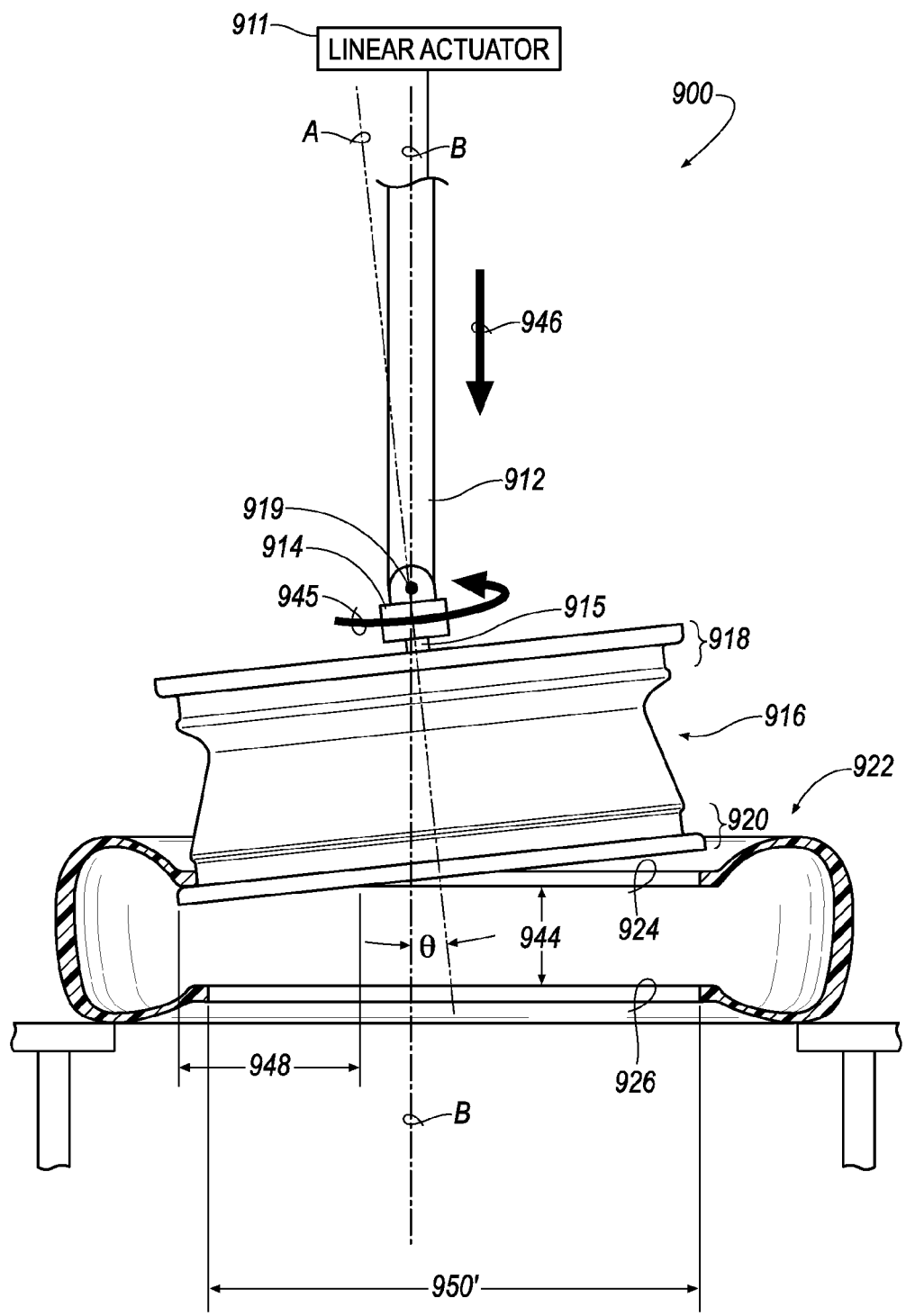
FIG. 10B is the system of FIG. 10A wherein the bead seating portion of the wheel is partially passed through an opening formed by a first bead of the tire.
Figure 10C:
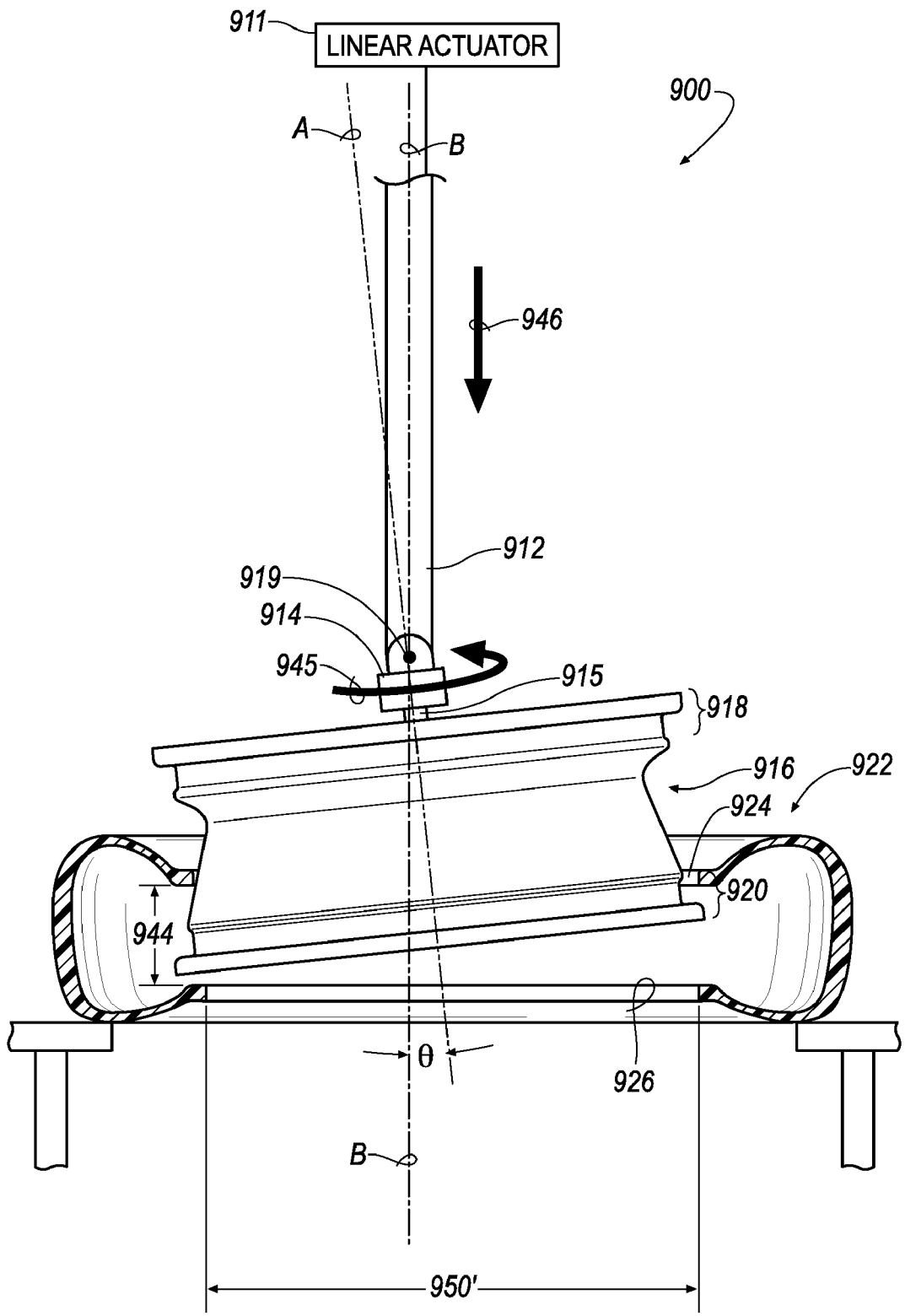
FIG. 10C is the system of FIG. 10A wherein a first bead seat portion of the wheel is completely passed through an opening formed by the first bead of the tire.
Figure 10D:
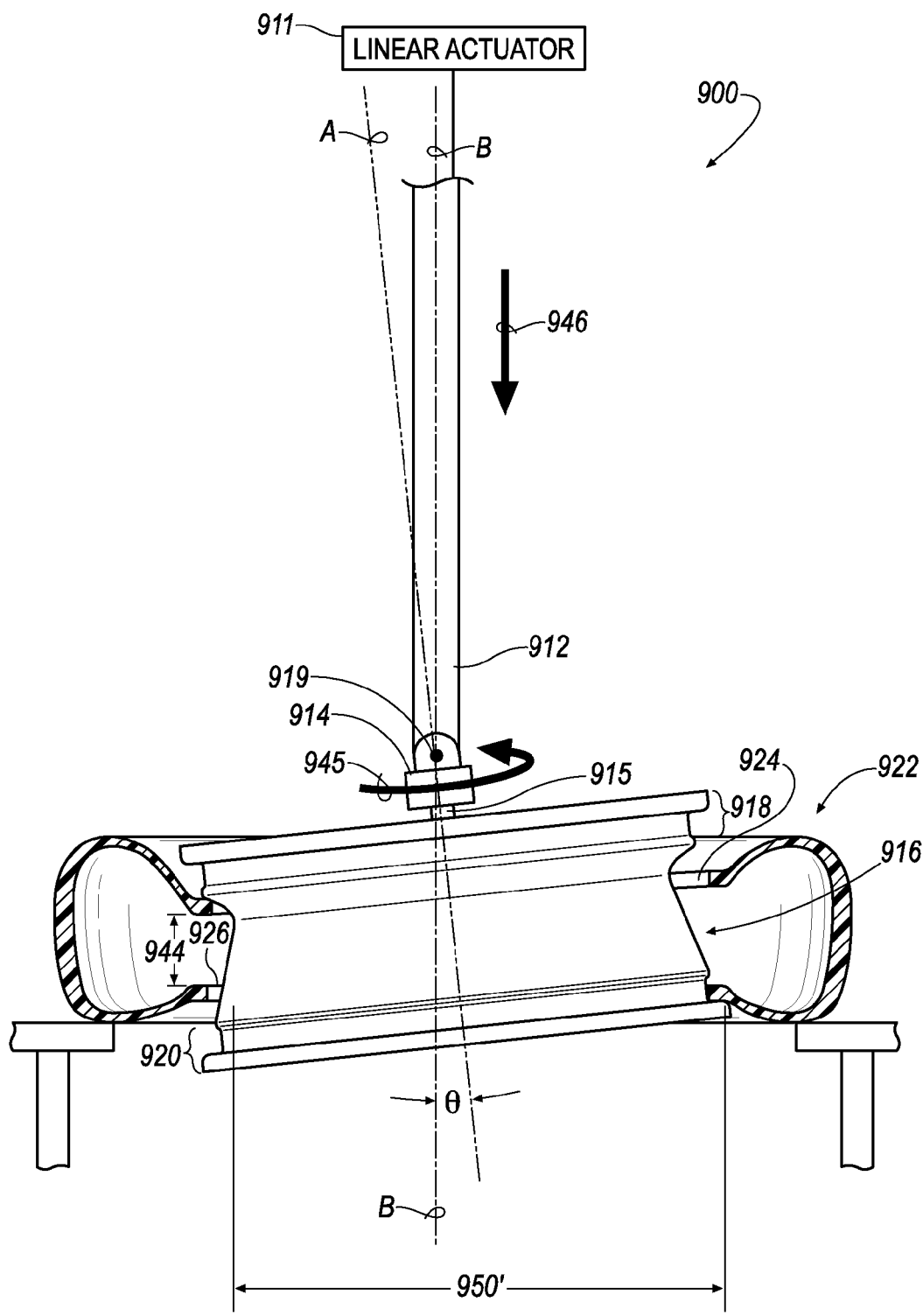
FIG. 10D is the system of FIG. 10A wherein the first bead seat of the wheel is completely passed through a second opening formed by a second bead of the tire.

Now referring to FIG. 10A, in a further embodiment, wheel support arm assembly 910 works in the exact manner as described in conjunction with FIGS. 9A-9D. However, in the embodiment of FIG. 10A-10D, tire beads 924, 926 are not pinched together by a bead compression mechanism but rather beads 924, 926 of tire 922 are left in a relaxed state. Now referring to FIGS. 10A and 10B, next, wheel support arm assembly 910 is moved linearly 946 along axis B while, simultaneously, wheel 916 is rotated 945 about axis A. As second bead seat 920 of wheel 916 is brought into contact with first tire bead 924 of tire 922, a portion 948 of second bead seat 920 will pass through opening 950 formed by first and second bead 924, 926 of tire 922. Next, as base 912 continues its linear 946 motion, second bead seat 920 of wheel 916 will completely pass through upper opening 950 formed by first bead 924 of tire 922 (see FIG. 10C). Next, as base 912 is still further urged along axis B, second bead seat 920 of wheel 916 will pass through lower opening 950' formed by second bead 926 of tire 922. Next, the wheel/tire assembly is released from spindle 915 whereby it is shuttled to the next work station to be inflated, balanced, and the like. Although FIGS. 9A through 10D generally show that the wheel opening of tire 922 is generally concentric with axis B, nothing herein shall limit the orientation of tire 922 relative to axis B in this way. It is contemplated that other orientations between axis B and the wheel opening of tire 922 will work equally well. Also it is understood that tire 922 is secured in a way that generally impedes it from rotating or otherwise moving (in response to the forces exerted on it by wheel 916). However, it is not necessary to prevent all rotary movement of the tire as it reacts to the rotational energy imparted to it by the rotating wheel. In fact it is contemplated that the mounting process may be improved by allowing the tire to undergo a controlled amount of movement during the mounting procedure. Although the installation of the wheel and tire have been illustrated in terms of the wheel rotating and moving linearly relative to the fixed wheel, it is fully contemplated that the position of the wheel and the tire can be interchanged without adversely affecting the disclosed method.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

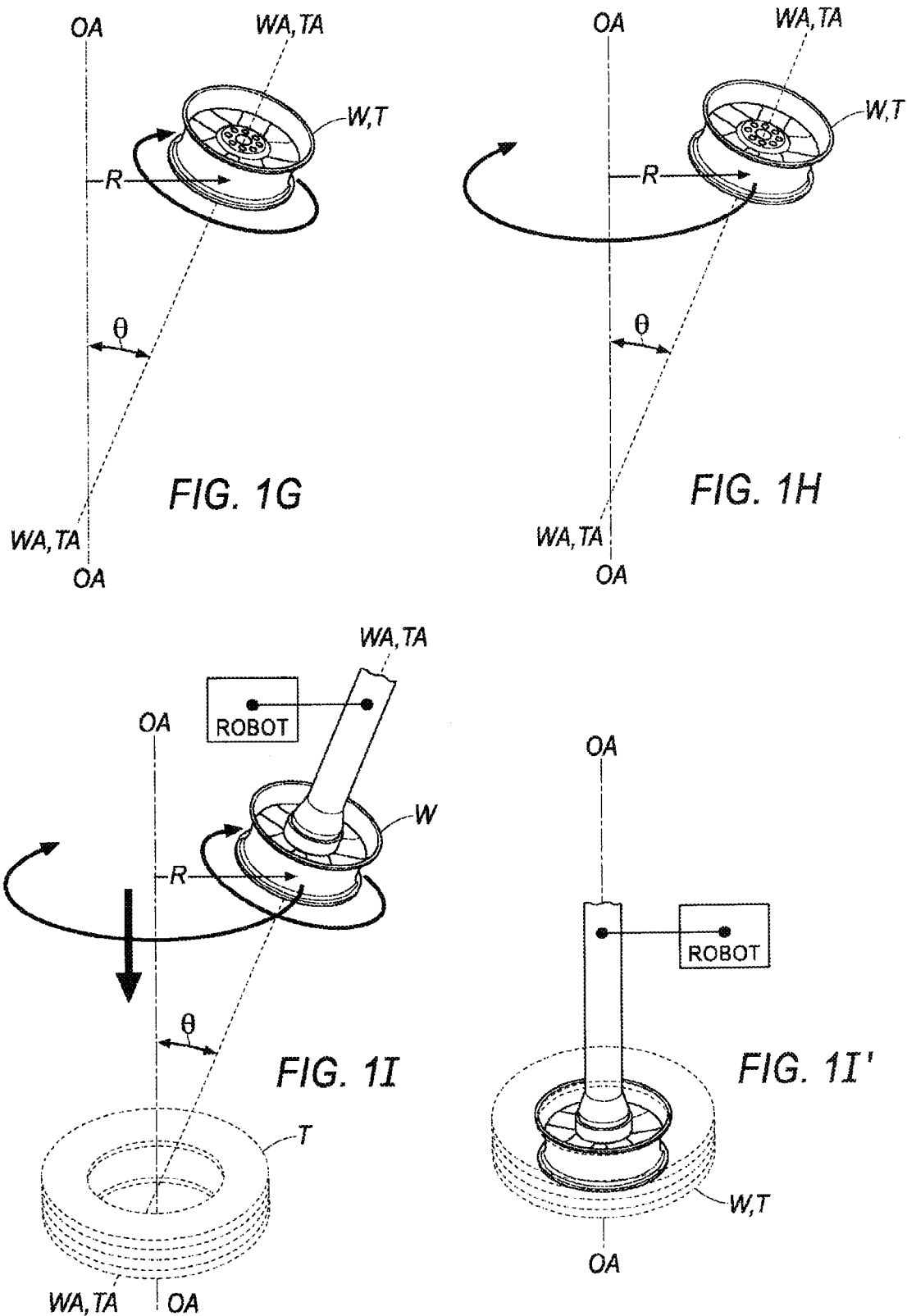

The invention claimed is:

1. A method of mounting a tire and a wheel together to form a tire/wheel assembly, wherein the tire includes an outer circumferential tread surface that connects a first tire sidewall surface to a second tire sidewall surface, wherein the first tire sidewall surface terminates to form a first tire bead, wherein the second tire sidewall surface terminates to form a second tire bead, wherein each of the first and second tire beads form a tire opening, wherein the wheel includes a first bead seat and a second bead seat, wherein disposal of the wheel in the tire opening results in the first tire bead being disposable upon the first bead seat and the second tire bead being disposable upon the second beat seat, whereupon disposal of the first and second tire beads upon the first and second bead seats results in formation of the tire/wheel assembly, the method comprising the steps of:
    providing a mounting system including:
        a support arm including a first distal end and a second distal end,
        an actuator connected to the second distal end of the support arm, and
        a supporting member including an upper support surface;
    positionally-retaining the first tire sidewall surface of the tire upon the upper support surface of the supporting member such that the tire remains in a passive, non-manipulated orientation upon the upper support surface of the supporting member; and
    retaining the wheel to the first distal end of the support arm such that the first distal end of the support arm carries the wheel above the tire in an initially spaced-apart orientation relative to the passive, non-manipulated orientation of the tire upon the upper support surface of the supporting member,
    actuating the actuator for imparting movement of the support arm that results in a corresponding movement to the wheel while the tire remains in the passive, non-manipulated orientation upon the upper support surface of the supporting member;
    progressively-reducing the initially spaced-apart orientation of the wheel and the passive, non-manipulated orientation of the tire upon the upper support surface of the supporting member such that the wheel is eventually arranged within the tire opening to form the tire/wheel assembly, wherein the mounting system only directly contacts the first tire sidewall surface of the tire with the upper support surface of the supporting member and never directly contacts any other surface of the tire including: the outer circumferential tread surface, the second tire sidewall surface, the first tire bead and the second tire bead, wherein the actuator is a precessional movement actuator, wherein the imparting movement step includes:
    precessionally driving the support arm to impart a corresponding precessional movement to the wheel while the tire remains in the passive, non-manipulated orientation upon the upper support surface of the supporting member, wherein the precessional movement to the wheel includes the steps of
    rotating the wheel about a first axis coincident with a wheel axis of rotation; and
    rotating the wheel about a second axis that is not coincident with the wheel axis of rotation.

2. The method according to claim 1, wherein the progressively-reducing step further includes the step of
    axially moving the tire toward the wheel.

* * * * *

UNITED STATES PATENT AND TRADEMARK OFFICE
CERTIFICATE OF CORRECTION

Page 1 of 2

PATENT NO. : 8,261,805 B2
APPLICATION NO. : 13/039518
DATED : September 11, 2012
INVENTOR(S) : Lawrence J. Lawson et al.

It is certified that error appears in the above-identified patent and that said Letters Patent is hereby corrected as shown below:

In the Drawings

Title page, illustrative fig(s) 1I should be deleted and substitute therefore the attached title page consisting of illustrative fig(s) 1I.

The drawing sheets 5 of 26 consisting of fig(s) 1G, 1H, 1I, 1I' should be deleted and substitute therefore the attached drawing sheet(s) 5 or 26 consisting of fig(s) 1G, 1H, 1I, 1I'.

Signed and Sealed this
Eleventh Day of December, 2012

David J. Kappos
*Director of the United States Patent and Trademark Office*